US010602466B2

(12) United States Patent
Venkatachalam Jayaraman et al.

(10) Patent No.: US 10,602,466 B2
(45) Date of Patent: Mar. 24, 2020

(54) MULTI-BASIC SERVICE SET UPLINK TIME ALIGNMENT

(71) Applicant: QUALCOMM Incorporated, San Diego, CA (US)

(72) Inventors: Venkata Ramanan Venkatachalam Jayaraman, San Diego, CA (US); Abhishek Pramod Patil, San Diego, CA (US); Alfred Asterjadhi, San Diego, CA (US); George Cherian, San Diego, CA (US); Yan Zhou, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/808,336

(22) Filed: Nov. 9, 2017

(65) Prior Publication Data

US 2019/0141651 A1    May 9, 2019

(51) Int. Cl.
*H04W 56/00* (2009.01)
*H04W 72/04* (2009.01)

(52) U.S. Cl.
CPC ..... *H04W 56/0005* (2013.01); *H04W 56/002* (2013.01); *H04W 72/04* (2013.01)

(58) Field of Classification Search
None
See application file for complete search history.

(56) References Cited

U.S. PATENT DOCUMENTS

2015/0078298 A1    3/2015    Barriac et al.
2016/0113034 A1*   4/2016    Seok .................... H04W 74/04
                                                    370/329

(Continued)

FOREIGN PATENT DOCUMENTS

EP    2966789 A1 *  1/2016   ........ H04W 74/0816
EP    3030027 A1    6/2016

(Continued)

OTHER PUBLICATIONS

International Search Report and Written Opinion—PCT/US2018/054834—ISA/EPO—dated Nov. 27, 2018.

*Primary Examiner* — Yemane Mesfin
*Assistant Examiner* — Jeff Banthrongsack
(74) *Attorney, Agent, or Firm* — Holland & Hart LLP

(57) ABSTRACT

This disclosure provides systems, devices, apparatus and methods, including computer programs encoded on storage media, for multi-basic service set (BSS) time alignment. In one implementation, an access point (AP) may determine a first transmission parameter for a first trigger transmission to be sent to a station (STA) belonging to the first BSS. The first transmission parameter may include a transmission order for time-separated trigger transmissions, non-overlapping bandwidths for frequency-separated trigger transmissions, trigger data precoding information for spatially-separated trigger transmissions, or a combination thereof. The AP may transmit the first trigger transmission to the first STA, and in response, receive a first synchronized transmission from the first STA. The first synchronized transmission may be synchronized, for example, aligned in time, with a second synchronized transmission from a second STA of a second set of STAs in a second BSS.

25 Claims, 17 Drawing Sheets

(56) References Cited

U.S. PATENT DOCUMENTS

| | | |
|---|---|---|
| 2016/0316472 A1 | 10/2016 | Kwon et al. |
| 2017/0093600 A1* | 3/2017 | Li .................... H04L 5/0037 |
| 2017/0127440 A1 | 5/2017 | Chun et al. |
| 2017/0202023 A1 | 7/2017 | Zhou et al. |

FOREIGN PATENT DOCUMENTS

| | | | | |
|---|---|---|---|---|
| WO | WO-2017037994 A1 * | 3/2017 | ............ | H04W 16/28 |
| WO | WO2017037994 A1 | 3/2017 | | |

* cited by examiner

MULTI-BASIC SERVICE SET UPLINK TIME ALIGNMENT

TECHNICAL FIELD

This disclosure relates generally to wireless communications, and more specifically, to multi-basic service set (multi-BSS) time alignment.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the 802.11 family of standards is a basic service set (BSS), which is managed by an AP. Each BSS is identified by a service set identifier (SSID) that is advertised by the AP. An AP periodically broadcasts beacon frames to enable any STAs within wireless range of the AP to establish and maintain a communication link with the WLAN.

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and space). The AP may be coupled to a network, such as the Internet, and may enable a station to communicate via the network including communicating with other devices coupled to the AP.

Some examples of wireless communications systems may include implementations of multiple BSSs. In some cases, it may be advantageous for the STAs of different BSSs to transmit to respective APs at the same time. Some wireless communications systems, however, may lack a mechanism to enable STAs belonging to different BSSs to initiate transmissions to respective APs at the same time (that is, a mechanism for synchronized STA transmissions). That is, a wireless communication system lacking such a mechanism may not facilitate synchronized uplink transmissions from STAs of different BSSs. There exists a need for efficient and effective techniques for time-aligned uplink transmissions from STAs of different BSSs.

SUMMARY

The described techniques relate to improved methods, systems, devices, or apparatuses that support multi-basic service set (multi-BSS) time alignment. In some implementations, the described techniques relate to improved methods, systems, devices, or apparatuses that support multi-BSS uplink time alignment. Some examples of wireless communications systems may include multiple BSSs, for example, a first BSS and a second BSS. Each of the first BSS and the second BSS may include one or more wireless devices, such as access points (APs), that may be able to communicate with one or more other wireless devices, such as stations (STAs). Some examples of wireless communications systems may further include one or more uplink controllers. In some cases, an uplink controller may be a separate entity from the APs associated with the related BSSs. In other cases, the functions of the uplink controller may be performed by an AP of one of the BSSs.

In some implementations, a controller (for example, an AP of one of the BSSs, or a device distinct from an AP of at least one of the BSSs) may determine a first transmission parameter for a first trigger transmission to be sent to a STA belonging to the first BSS. The first transmission parameter may, for example, include a transmission order for time-separated trigger transmissions, non-overlapping bandwidths for frequency-separated trigger transmissions, trigger data precoding information for spatially-separated trigger transmissions, or a combination thereof. Based on the first transmission parameter, an AP may transmit the first trigger transmission to a first STA of a first set of STAs in the first BSS based on the first transmission parameter. Based on the first trigger transmission, the first STA may then transmit to the AP a first synchronized transmission at a first time. The first synchronized transmission may be synchronized (for example, aligned in time) at the first time with a second synchronized transmission from a second STA of a second set of STAs in a second BSS.

The systems, methods and devices of this disclosure each have several innovative aspects, no single one of which is solely responsible for the desirable attributes disclosed herein.

A method of wireless communication is described. The method may include determining a first transmission parameter for a first trigger transmission, transmitting the first trigger transmission to a first STA of a first set of STAs in a first BSS based at least in part on the first transmission parameter, and receiving a first synchronized transmission at a first time from the first STA of the first set of STAs based at least in part on the first trigger transmission, wherein the first synchronized transmission is synchronized with a second synchronized transmission at the first time from a second STA of a second set of STAs in a second BSS.

An apparatus for wireless communication is described. The apparatus may include means for determining a first transmission parameter for a first trigger transmission, means for transmitting the first trigger transmission to a first STA of a first set of STAs in a first BSS based at least in part on the first transmission parameter, and means for receiving a first synchronized transmission at a first time from the first STA of the first set of STAs based at least in part on the first trigger transmission, wherein the first synchronized transmission is synchronized with a second synchronized transmission at the first time from a second STA of a second set of STAs in a second BSS.

Another apparatus for wireless communication is described. The apparatus may include a processor, memory in electronic communication with the processor, and instructions stored in the memory. The instructions may be operable to cause the processor to determine a first transmission parameter for a first trigger transmission, transmit the first trigger transmission to a first STA of a first set of STAs in a first BSS based at least in part on the first transmission parameter, and receive a first synchronized transmission at a first time from the first STA of the first set of STAs based at least in part on the first trigger transmission, wherein the first synchronized transmission is synchronized with a second synchronized transmission at the first time from a second STA of a second set of STAs in a second BSS.

A non-transitory computer-readable medium for wireless communication is described. The non-transitory computer-readable medium may include instructions operable to cause a processor to determine a first transmission parameter for a first trigger transmission, transmit the first trigger transmission to a first STA of a first set of STAs in a first BSS based at least in part on the first transmission parameter, and receive a first synchronized transmission at a first time from the first STA of the first set of STAs based at least in part on the first trigger transmission, wherein the first synchronized transmission is synchronized with a second synchronized transmission at the first time from a second STA of a second set of STAs in a second BSS.

Some examples of the method, apparatus, and non-transitory computer-readable medium described above may further include processes, features, means, or instructions for receiving, from a controller, an indication of the first transmission parameter, wherein determining the first transmission parameter may be based at least in part on the received indication of the first transmission parameter.

Some examples of the method, apparatus, and non-transitory computer-readable medium described above may further include processes, features, means, or instructions for determining a first reference time for the first trigger transmission. Some examples of the method, apparatus, and non-transitory computer-readable medium described above may further include processes, features, means, or instructions for transmitting the first trigger transmission at the first reference time to the first STA.

Some examples of the method, apparatus, and non-transitory computer-readable medium described above may further include processes, features, means, or instructions for determining a second transmission parameter for a second trigger transmission. Some examples of the method, apparatus, and non-transitory computer-readable medium described above may further include processes, features, means, or instructions for transmitting an indication of the second transmission parameter to a second AP in the second BSS.

Some examples of the method, apparatus, and non-transitory computer-readable medium described above may further include processes, features, means, or instructions for determining a second reference time for a second trigger transmission. Some examples of the method, apparatus, and non-transitory computer-readable medium described above may further include processes, features, means, or instructions for transmitting an indication of the second reference time for the second trigger transmission to the second AP.

In some implementations of the method, apparatus, and non-transitory computer-readable medium described above, the first reference time and the second reference time may be different. In some implementations of the method, apparatus, and non-transitory computer-readable medium described above, the second transmission parameter includes an indication of a second trigger data precoding for the second trigger transmission.

In some implementations of the method, apparatus, and non-transitory computer-readable medium described above, the AP may be a controller.

In some implementations of the method, apparatus, and non-transitory computer-readable medium described above, the first transmission parameter includes a transmission order for the first trigger transmission to be transmitted to the first STA relative to a second trigger transmission to be transmitted to the second STA. In some implementations of the method, apparatus, and non-transitory computer-readable medium described above, the first transmission parameter includes a first transmission bandwidth for the first trigger transmission to be transmitted to the first STA and a second transmission bandwidth different than the first transmission bandwidth for the second trigger transmission to be transmitted to the second STA. In some implementations of the method, apparatus, and non-transitory computer-readable medium described above, the second transmission parameter includes a second transmission bandwidth for the second trigger transmission to be transmitted to the second STA and a first transmission bandwidth for the first trigger transmission to be transmitted to the first STA.

In some implementations of the method, apparatus, and non-transitory computer-readable medium described above, the first transmission bandwidth may be frequency-separated from the second transmission bandwidth.

In some implementations of the method, apparatus, and non-transitory computer-readable medium described above, the determining of the first transmission parameter includes determining, by the AP, a first trigger data precoding for the first trigger transmission. Some examples of the method, apparatus, and non-transitory computer-readable medium described above may further include processes, features, means, or instructions for receiving, from a controller, trigger data precoding information that includes channel information, wherein the determining of the first trigger data precoding includes computing a transmission stream based at least in part on the channel information.

Some examples of the method, apparatus, and non-transitory computer-readable medium described above may further include processes, features, means, or instructions for receiving, from a controller, an indication of a first spatial stream, wherein transmitting the first trigger transmission to the first STA includes transmitting the first trigger transmission in the first spatial stream, the first spatial stream different from a second spatial stream in which a second trigger transmission is transmitted.

A method of wireless communication is described. The method may include determining a first transmission parameter for a first trigger transmission, determining a first reference time for the first trigger transmission, and transmitting an indication of the first transmission parameter and an indication of the first reference time for the first trigger transmission to a first AP in a first BSS to synchronize a first synchronized transmission from a first STA in a first set of STAs in the first BSS with a second synchronized transmission from a second STA of a second set of STAs in a second BSS.

An apparatus for wireless communication is described. The apparatus may include means for determining a first transmission parameter for a first trigger transmission, means for determining a first reference time for the first trigger transmission, and means for transmitting an indication of the first transmission parameter and an indication of the first reference time for the first trigger transmission to a first AP in a first BSS to synchronize a first synchronized transmission from a first STA in a first set of STAs in the first BSS with a second synchronized transmission from a second STA of a second set of STAs in a second BSS.

Another apparatus for wireless communication is described. The apparatus may include a processor, memory in electronic communication with the processor, and instructions stored in the memory. The instructions may be operable to cause the processor to determine a first transmission parameter for a first trigger transmission, determine a first reference time for the first trigger transmission, and transmit an indication of the first transmission parameter and an indication of the first reference time for the first trigger transmission to a first AP in a first BSS to synchronize a first synchronized transmission from a first STA in a first set of STAs in the first BSS with a second synchronized transmission from a second STA of a second set of STAs in a second BSS.

A non-transitory computer-readable medium for wireless communication is described. The non-transitory computer-readable medium may include instructions operable to cause a processor to determine a first transmission parameter for a first trigger transmission, determine a first reference time for the first trigger transmission, and transmit an indication of the first transmission parameter and an indication of the first reference time for the first trigger transmission to a first AP in a first BSS to synchronize a first synchronized transmission from a first STA in a first set of STAs in the first BSS with a second synchronized transmission from a second STA of a second set of STAs in a second BSS.

Some examples of the method, apparatus, and non-transitory computer-readable medium described above may further include processes, features, means, or instructions for determining a second transmission parameter for a second trigger transmission. Some examples of the method, apparatus, and non-transitory computer-readable medium described above may further include processes, features, means, or instructions for determining a second reference time for the second trigger transmission. Some examples of the method, apparatus, and non-transitory computer-readable medium described above may further include processes, features, means, or instructions for transmitting an indication of the second transmission parameter and an indication of the second reference time for the second trigger transmission to a second AP in the second BSS to synchronize the second synchronized transmission from the second STA with the first synchronized transmission from the first STA.

In some implementations of the method, apparatus, and non-transitory computer-readable medium described above, the first reference time and the second reference time may be time separated. In some implementations of the method, apparatus, and non-transitory computer-readable medium described above, the first transmission parameter includes a transmission order for the first trigger transmission relative to the second trigger transmission.

In some implementations of the method, apparatus, and non-transitory computer-readable medium described above, the first transmission parameter includes a first transmission bandwidth for the first trigger transmission different than a second transmission bandwidth for a second trigger transmission. In some implementations of the method, apparatus, and non-transitory computer-readable medium described above, the first transmission bandwidth may be frequency-separated from the second transmission bandwidth.

Some examples of the method, apparatus, and non-transitory computer-readable medium described above may further include processes, features, means, or instructions for determining a first trigger data precoding for the first trigger transmission, wherein the first transmission parameter includes an indication of the first trigger data precoding for the first trigger transmission. Some examples of the method, apparatus, and non-transitory computer-readable medium described above may further include processes, features, means, or instructions for determining channel information for at least a second AP different than the first AP, wherein the indication of the first trigger data precoding includes the channel information. Some examples of the method, apparatus, and non-transitory computer-readable medium described above may further include processes, features, means, or instructions for determining an indication of a first spatial stream, wherein the indication of the first trigger data precoding includes the indication of the first spatial stream.

In some implementations of the method, apparatus, and non-transitory computer-readable medium described above, the controller may be an AP.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
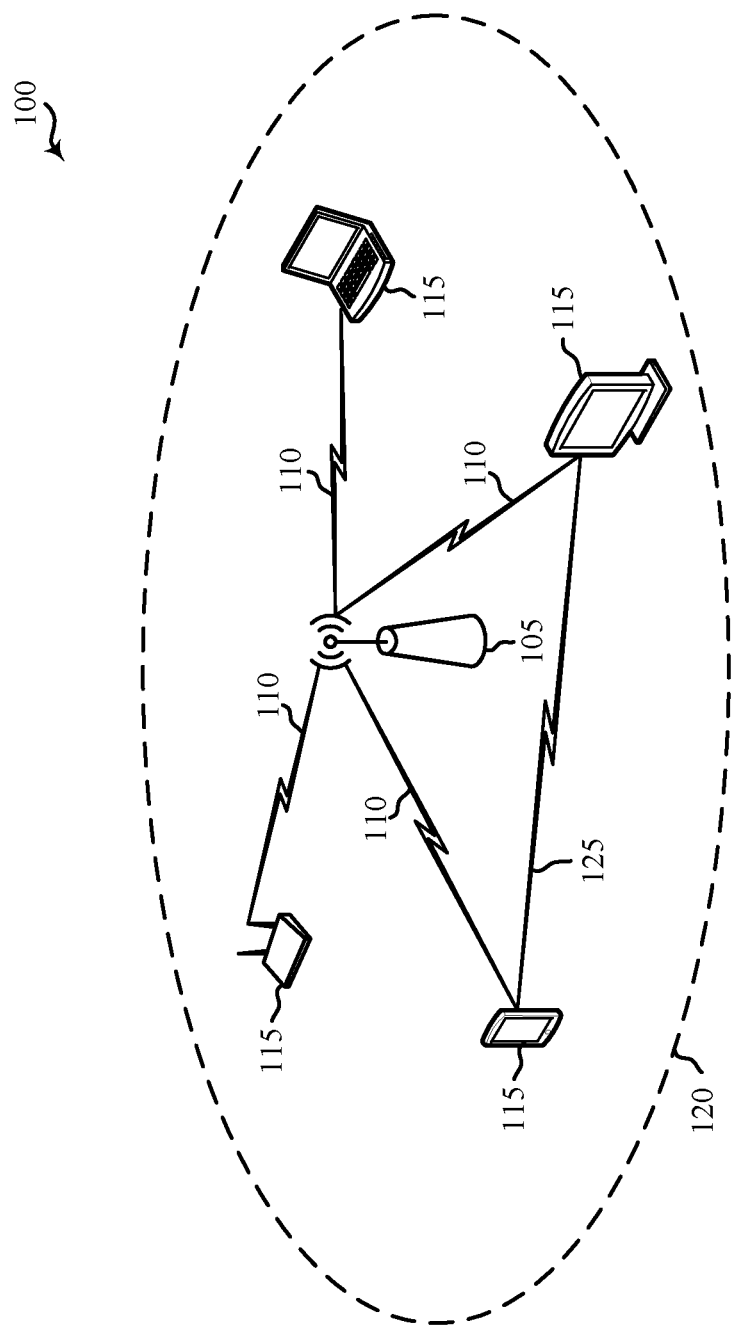
FIGS. 1-2 illustrate examples of wireless communications systems that support multi-basic service set (multi-BSS) time alignment in accordance with various aspects of the present disclosure.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the Institute of Electrical and Electronics Engineers (IEEE) 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IoT) network, such as a system utilizing 3G, 4G or 5G, or further implementations thereof, technology.

Various implementations relate generally to wireless communications. Some implementations more specifically relate to uplink transmission time alignment for multiple basic service sets (BSSs). Particular implementations of the subject matter described in this disclosure can be implemented to realize one or more of the following potential advantages. In some implementations, the described techniques can be used for uplink (UL)-distributed multiple-input, multiple-output (MIMO) and OFDMA across multiple BSSs, providing for relatively increased air-time efficiency (that is, the percentage of air-time used by data symbols versus control symbols), for example, when transmissions of stations (STAs) may include relatively small packets.

An access point (AP) and an uplink controller may support techniques for aligning, in the time domain, uplink transmissions from STAs belonging to multiple, different BSSs. In some cases, one or more of the operations of the uplink controller may be performed by the AP of one or more of the associated BSSs. In this case, the AP operating as the uplink controller may be referred to herein as the uplink controller. In other cases, the uplink controller may be a separate entity from the APs associated with the related BSSs.

Some existing wireless communications systems may not provide for a mechanism to enable STAs belonging to different BSSs to initiate transmissions at the same time across multiple BSSs (that is, synchronized transmissions between the multiple BSSs). Time-aligned synchronized uplink transmissions, that is, uplink transmissions synchronized in the time domain, may be used in, for example, UL-distributed MIMO and in OFDMA across multiple BSSs.

An uplink controller may identify the respective one or more APs of each BSS to be receiving APs, and the corresponding STAs in each BSS as participating STAs. In some cases, the uplink controller may provide the receiving APs with information that the APs may use to transmit trigger transmissions (also referred to herein simply as "triggers") that are time-separated from each other. Additionally or alternatively, the uplink controller may provide the receiving APs with information such that the APs' trigger transmissions may be frequency-separated on different non-overlapping bandwidths. Additionally or alternatively, the uplink controller may provide the receiving APs with information such that the APs' trigger transmissions may be spatially-separated (on, for example, different spatial streams). After receiving the information for the trigger transmissions from the uplink controller, the APs of each BSS may, at one or more reference times, transmit the trigger transmissions to each of the participating STAs in the APs' respective BSSs based on the information provided from the uplink controller. In response to the trigger transmissions, each of the STAs may reply with synchronized transmissions to the respective APs (for example, to one or more of the APs associated with one or more of the BSSs), where, in some cases, the synchronized transmissions from the STAs may be time-aligned.

In some implementations, these time aligned transmissions from the STAs of different BSSs may be used for UL-distributed MIMO and in OFDMA across multiple BSSs. In UL-distributed MIMO, for example, the uplink transmissions from STAs of multiple BSSs may be separated in the spatial domain despite overlapping with each other in the time domain and the frequency domain. In doing so, spectral efficiency may be increased through the use of multiple channels, thus providing for higher throughput and better system performance. In the case of OFDMA across multiple BSSs, multiple STAs may be assigned to non-overlapping radio frequency spectrum bandwidths (which may also be referred to as different resource units). This may provide for each STA to focus its transmit power on a narrow bandwidth. For example, the STAs of a first BSS may use the top half of a bandwidth, and the STAs of a second BSS may use the bottom half of the bandwidth. This may provide for path loss improvements and an increased communication range. This may further provide for increased air-time efficiency (that is, the percentage of air-time used by data symbols versus control symbols), for example, when the transmissions of the STAs include relatively smaller packets.

Aspects of the disclosure are initially described in the context of a wireless communications system. Aspects of the disclosure are further illustrated by and described with reference to apparatus diagrams, system diagrams, and flowcharts that relate to multi-BSS time alignment.

FIG. 1 illustrates an example of a wireless communications system 100 that supports multi-BSS time alignment in accordance with various aspects of the present disclosure. According to some aspects, the wireless communications system 100 can be an example of a wireless local area network (WLAN) (and will hereinafter be referred to as WLAN 100). For example, the WLAN 100 can be a network implementing at least one of the IEEE 802.11 family of standards. The WLAN 100 may include numerous wireless devices such as an access point (AP) 105 and multiple associated STAs 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a radio communication link 110. The various STAs 115 in the network are able to communicate with one another through the AP 105. A single AP 105 and an associated set of STAs 115 may be referred to as a BSS. FIG. 1 additionally shows an example coverage area 120 of the AP 105, which may represent a basic service area (BSA) of the WLAN 100. While only one AP 105 is shown, the WLAN network 100 can include multiple APs 105. An extended service set (ESS) may include a set of connected BSSs. An extended network station associated with the WLAN 100 may be connected to a wired or wireless distribution system that may allow multiple APs 105 to be connected in such an ESS. As such, a STA 115 can be covered by more than one AP 105 and can associate with different APs 105 at different times for different transmissions.

STAs 115 may function and communicate (via the respective radio communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the physical (PHY) and medium access control (MAC) layers. The wireless devices in the WLAN 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum may also include other frequency bands, such as the emerging 6 GHz band. The wireless devices in the WLAN 100 also can be configured to communicate over other frequency bands such as shared licensed frequency bands, where multiple operators may have a license to operate in the same or overlapping frequency band or bands.

In some cases, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some cases, ad hoc networks may be implemented within a larger wireless network such as the WLAN 100. In such implementations, while the STAs 115 may be capable of communicating with each other through the AP 105 using radio communication links 110, STAs 115 also can communicate directly with each other via direct wireless communication links 125. Additionally, two STAs 115 may communicate via a direct wireless communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other peer-to-peer (P2P) group connections.

Some types of STAs 115 may provide for automated communication. Automated wireless devices may include those implementing IoT communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that can make use of the information or present the information to humans interacting with the program or application.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beamformed transmissions. As an example, an AP 105 may use multiple antennas or antenna arrays to conduct beamforming operations for directional communications with a STA 115. Beamforming (which may also be referred to as spatial filtering or directional transmission) is a signal processing technique that may be used at a transmitter (for example, an AP 105) to shape and/or steer an overall antenna beam in the direction of a target receiver (for example, a STA 115). Beamforming may be achieved by combining elements in an antenna array in such a way that transmitted signals at particular angles experience constructive interference while others experience destructive interference. In some cases, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (for example, or antenna port) such that the desired beamforming effects are achieved. In some cases, these weights may be determined before beamforming can be employed. For example, the transmitter (for example, an AP 105) may transmit one or more sounding packets to the receiver in order to determine CSI.

WLAN 100 may further support MIMO wireless systems. Such systems may use a transmission scheme between a transmitter (for example, an AP 105) and a receiver (for example, a STA 115), where both transmitter and receiver are equipped with multiple antennas. For example, an AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (for example, a STA 115) may try multiple beams (for example, antenna subarrays) while receiving the signals.

WLAN PDUs may be transmitted over a radio frequency spectrum band, which in some implementations may include multiple sub-bands or frequency channels. In some cases, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiving device to decode the subsequent data. A legacy WLAN preamble may include legacy short training field (STF) (L-STF) information, legacy long training field (L-LTF) information, and legacy signaling (L-SIG) information. The legacy preamble may be used for packet detection, automatic gain control and channel estimation, among other uses. The legacy preamble may also be used to maintain compatibility with legacy devices.

As described above, some existing wireless communications systems may not provide for a mechanism to enable STAs 115 belonging to different BSSs to initiate transmissions at the same time across multiple BSSs (that is, synchronized transmissions). That is, a wireless communication system lacking such a mechanism may not provide for synchronized uplink transmissions from STAs 115 of different BSSs.

Time-aligned synchronized uplink transmissions may be used in, for example, UL-distributed MIMO and in OFDMA across multiple BSSs. In UL-distributed MIMO, the uplink transmissions from STAs 115 of multiple BSSs are time-aligned but separated in the spatial domain despite overlapping with each other in the time domain and the frequency domain. In the case of OFDMA across multiple BSSs, multiple STAs 115 may be assigned to non-overlapping radio frequency spectrum bandwidths (which may also be referred to as different resource units), enabling time-aligned uplink transmissions. This may provide for each STA 115 to focus its transmit power on a narrow bandwidth, which may accordingly provide for an increased communication range. This may further provide for increased air-time efficiency (that is, the percentage of air-time used by data symbols versus control symbols), for example, when the transmissions of the STAs 115 include relatively smaller packets.

A controller may perform operations to control one or more of the APs 105 to provide for the described multi-BSS time alignment techniques. In some cases, the controller may be a separate entity from the APs 105 in the BSSs with which the controller communicates. In this case, the controller may not be within one of the BSSs. However, in some cases, an AP 105 may be the same entity as, or may include, the controller. In these cases, the AP 105 may perform the operations of the controller (for example, controlling another AP 105) while itself being within one of the BSSs. As described below, the operations described as being performed by a controller 210-a may be performed by an AP 105-c and an AP 105-d. The operations described as being performed by an AP 105-c of the first BSS may be similarly or alternatively performed by an AP 105-d of the second BSS.

In some implementations, an AP 105 (which, in some cases, may be an example of a controller) determines a first transmission parameter for a first trigger transmission to be sent to a STA 115 belonging to a first BSS. The first transmission parameter may, for example, include a transmission order for time-separated trigger transmissions, non-overlapping bandwidths for frequency-separated trigger transmissions, trigger data precoding information for spatially-separated trigger transmissions, or a combination thereof. An AP 105 may transmit the first trigger transmission to a first STA 115 of a first set of STAs in the first BSS based on the first transmission parameter. Based on the first trigger transmission, the first STA 115 of the first set of STAs may then transmit to the AP 105 a first synchronized transmission at a first time. The first synchronized transmission may be synchronized with a second synchronized transmission. In some cases, synchronized transmissions may be time-aligned. For example, the first synchronized transmission may be aligned in time at the first time with the second synchronized transmission from a second STA 115 of a second set of STAs in a second BSS.

In some implementations, for example when an uplink controller is a separate entity from the APs 105, the uplink controller determines a first transmission parameter for a first trigger transmission. For example, the first transmission parameter may include a transmission order for time-separated trigger transmissions, non-overlapping bandwidths for frequency-separated trigger transmissions, trigger data precoding information for spatially-separated trigger transmissions, or a combination thereof. The controller may determine a first reference time at which an AP 105 of the first BSS may transmit the first trigger transmission. The controller may then transmit an indication of the first transmission parameter and an indication of the first reference time for the first trigger transmission to a first AP 105 in a first BSS to synchronize a first synchronized transmission from a first STA 115 in a first set of STAs in the first BSS with a second synchronized transmission from a second STA 115 of a second set of STAs in a second BSS.

Figure 2:
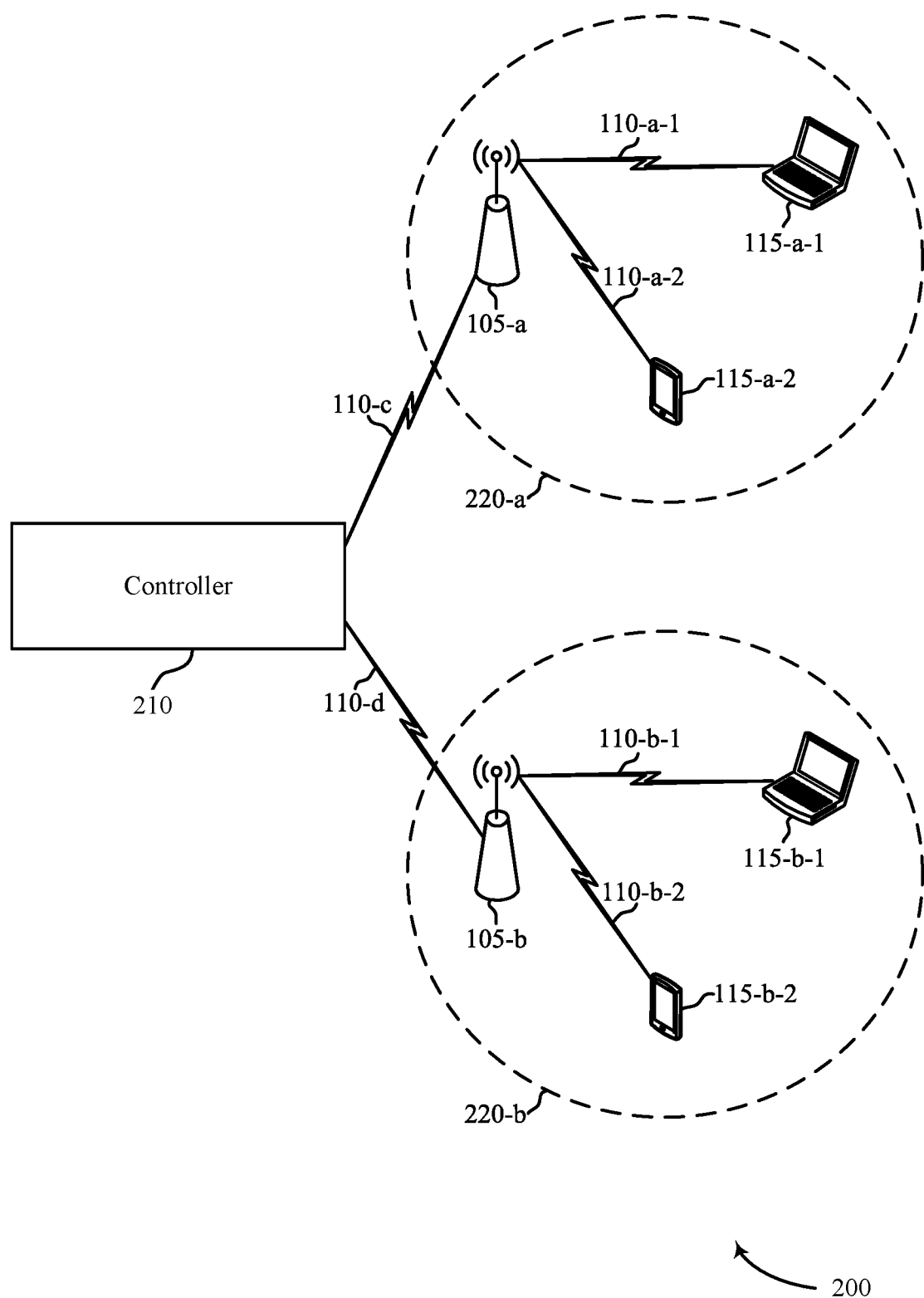

FIG. 2 illustrates an example of a wireless communications system 200 that supports multi-BSS time alignment in accordance with various aspects of the present disclosure. The wireless communications system 200 illustrates of an example of wireless communications between a controller 210 and an AP 105-a in a BSS 220-a and an AP 105-b in a BSS 220-b. The wireless communications system 200 further illustrates of an example of wireless communications between the AP 105-a and the STAs 115-a-1 and 115-a-2 of a set of STAs of the BSS 220-a, and between the AP 105-b and the STAs 115-b-1 and 115-b-2 of a set of STAs of the BSS 220-b. In some implementations, the STAs 115-a-1, 115-a-2, 115-b-1, and 115-b-2 and the APs 105-a and 105-b may be examples of the STAs 115 and the AP 105 as described with reference to FIG. 1. The AP 105-a may communicate with the STA 115-a-1 over the radio communication link 110-a-1 and with the STA 115-a-2 over the radio communication link 110-a-2. The AP 105-b may communicate with the STA 115-b-1 over the radio communication link 110-b-1 and with the STA 115-b-2 over the radio communication link 110-b-2. The controller 210 may communicate with the AP 105-a over the radio communication link 110-c. The controller 210 may communicate with the AP 105-b over the radio communication link 110-d.

The controller 210 may determine the AP 105-a to be a receiving AP for the BSS 220-a, and the STA 115-a-1 and the STA 115-a-2 to be participating STAs of the BSS 220-a. Similarly, the controller 210 may determine the AP 105-b to be a receiving AP for the BSS 220-b, and the STA 115-b-1 and the STA 115-b-2 to be participating STAs of the BSS 220-b. In FIG. 2, the controller 210 is illustrated as an entity separate from the APs 105-a and 105-b. Alternatively, one of the AP 105-a or the AP 105-b may assume the role of the controller 210, for at least some duration, and perform functions similar to those described with respect to the controller 210.

In some cases, the controller 210 may provide the receiving APs with information that the APs may use to transmit trigger transmissions, and in some cases, in which the trigger transmissions are time-separated from each other. The controller 210 may provide each receiving AP with content and parameters for a trigger for transmission by the receiving APs. The trigger may include parameters for participating STAs, such that subsequent transmissions from the STAs may be synchronized (that is, providing for synchronized transmissions from each of the participating STAs). In some cases, the synchronized transmission may align in time. The controller 210 may further provide the receiving APs with a reference time at which or after which the receiving APs may transmit the respective triggers. The provided parameters may include an order in which the receiving APs may transmit the respective triggers after the reference time. The order may, in some implementations, include a time ($t_A$) for the second-ordered AP to wait after the reference time before transmitting its trigger, providing for a time separation between the first and second trigger transmissions. For example, the parameters may indicate to one or more of the respective receiving APs that the AP 105-a is to transmit first at a first reference time (time t1), and the AP 105-b is to transmit second at a second reference time after the first reference time (for example, at a time equal to the first reference time plus the time shift ($t_A$)).

After receiving the content and parameters for the trigger, the AP 105-a, for example, may, at the specified reference time, transmit a trigger to each participating STA of its respective BSS 220-a, here, a STA 115-a-1 and a STA 115-a-2. After waiting a specified time ($t_A$), the AP 105-b may transmit a trigger to the participating STAs in the BSS 220-b, being here, a STA 115-b-1 and a STA 115-b-2. After receiving the triggers, each participating STA in the BSS 220-a and the BSS 220-b may transmit according to the parameters in the trigger received from the respective APs. The subsequent transmissions of each of the participating STAs may then be synchronized (for example, aligned in time), based on the information received in the triggers.

Additionally or alternatively, the controller 210 may provide the receiving APs with information such that the APs' trigger transmissions may be frequency-separated. Similarly as described above, the controller 210 may provide each receiving AP with content and parameters for triggers for synchronized transmissions from participating STAs. Again, the controller may provide the receiving APs with a reference time at which the receiving APs may transmit the respective triggers. In the case of frequency-separated triggers, the provided parameters may specify particular non-overlapping radio frequency spectrum bandwidths for the receiving APs to transmit the triggers. For example, the parameters may indicate to the receiving APs that the AP 105-*a* is to transmit at the reference time in a first bandwidth, and that the AP 105-*b* is to transmit at the reference time in a second bandwidth not overlapping with the first bandwidth. As such, the AP 105-*a* and the AP 105-*b* may transmit the respective triggers simultaneously.

After receiving the content and parameters for the trigger, the AP 105-*a*, may, at the specified reference time, transmit a trigger using the first bandwidth to each participating STA of its respective BSS 220-*a*, here a STA 115-*a*-1 and a STA 115-*a*-2. The AP 105-*b* may transmit a trigger using the second bandwidth to the participating STAs in BSS 220-*b*, here a STA 115-*b*-1 and a STA 115-*b*-2. After receiving the triggers, each participating STA in the BSS 220-*a* and the BSS 220-*b* may transmit according to the parameters in the trigger received from the respective AP. These subsequent transmissions of each of the participating STAs may be synchronized, and thus, for example, time-aligned, based on the information received in the triggers.

Additionally or alternatively, the controller 210 may provide the receiving APs with information such that the APs' trigger transmissions may be spatially-separated. Similarly as described above, the controller 210 may provide each receiving AP with content and parameters for triggers for synchronized transmissions from participating STAs. The controller may provide the receiving APs with a reference time at which the receiving APs may transmit the respective triggers. In the case of spatially-separated triggers, the provided parameters may provide the receiving APs with information on channels between each of the participating STAs and the receiving APs. The receiving APs may then determine pre-coded trigger data streams to be used to transmit the respective triggers based on the received channel information. The pre-coding may accordingly provide for the receiving APs' trigger transmissions to be transmitted on distinct spatially-separated streams. Additionally or alternatively, the provided parameters may provide the receiving APs with the pre-coded trigger data streams to be used to transmit the triggers. For example, the parameters may indicate to the receiving APs that the AP 105-*a* is to transmit at the reference time using one or more first spatial streams, and that the AP 105-*b* is to transmit at the reference time using one or more second spatial streams. As such, the AP 105-*a* and the AP 105-*b* may transmit the respective triggers simultaneously.

After receiving the content and parameters for the trigger, the AP 105-*a*, may, at the specified reference time, transmit triggers using spatially-separated spatial streams to each participating STA of its respective BSS 220-*a*, here a STA 115-*a*-1 and a STA 115-*a*-2. Similarly, the AP 105-*b* may transmit triggers using spatially-separated spatial streams to the participating STAs of its respective BSS 220-*b*, here a STA 115-*b*-1 and a STA 115-*b*-2. After receiving the triggers, each participating STA in the BSS 220-*a* and the BSS 220-*b* may transmit according to the parameters in the trigger received from the respective APs. These subsequent transmissions of each of the participating STAs may then be synchronized (for example, aligned in time) based on the information received in the triggers.

Figure 3:
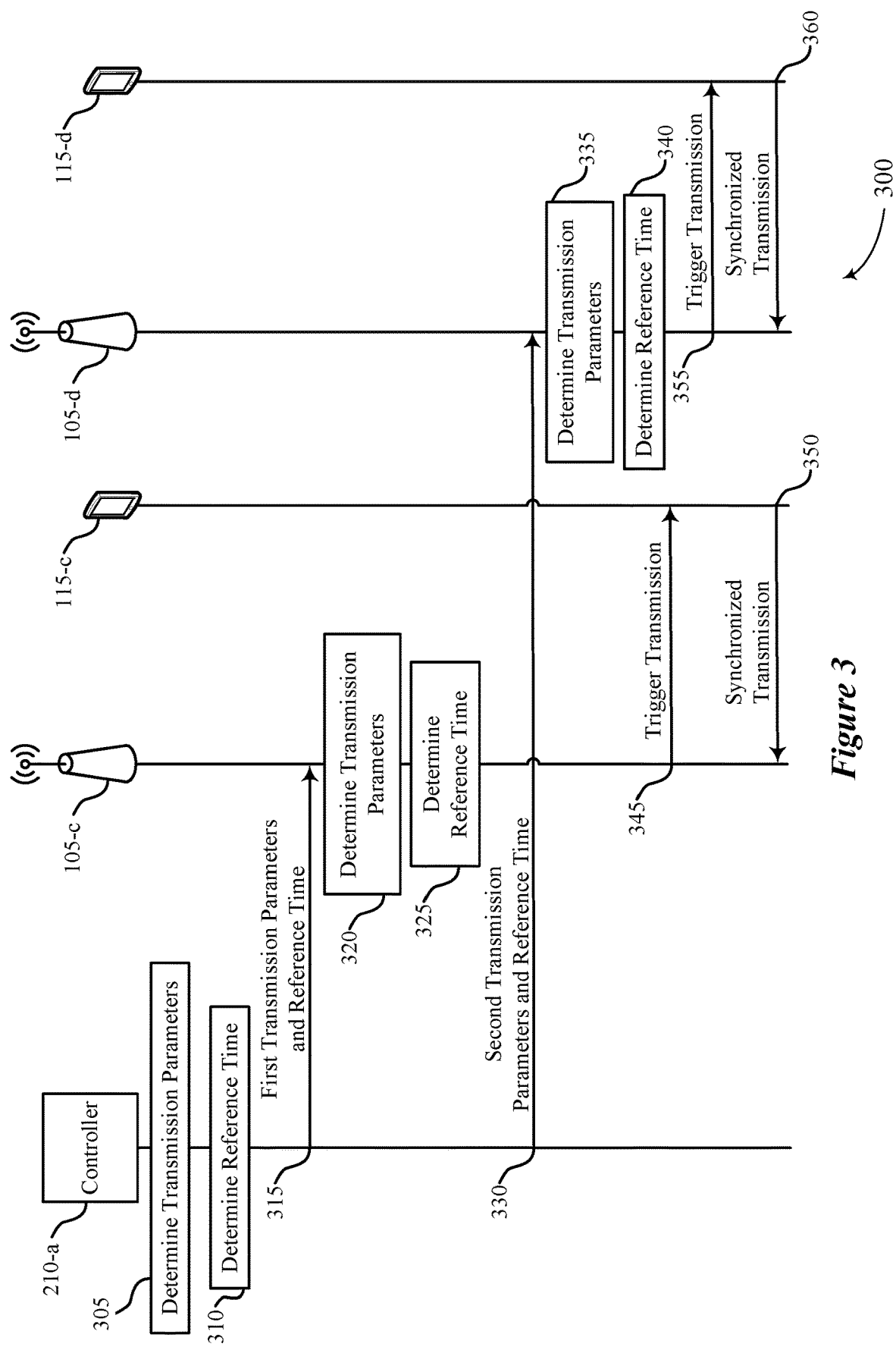
FIGS. 3-4 illustrate examples of process flows that support multi-BSS time alignment in accordance with various aspects of the present disclosure.

FIG. 3 illustrates an example of a process flow 300 that supports multi-BSS time alignment in accordance with various aspects of the present disclosure. In some implementations, the process flow 300 may implement aspects of the wireless communications systems 100 and 200. The process flow 300 may include operations performed by a controller 210-*a*, an AP 105-*c* of a first BSS, an AP 105-*d* of a second BSS, a STA 115-*c* of a set of STAs in the first BSS, and a STA 115-*d* of a set of STAs in the second BSS. Each of these devices may be examples of the corresponding devices as described with reference to FIGS. 1 and 2.

FIG. 3 shows the controller 210-*a* as being a separate entity from the AP 105-*c* and the AP 105-*d*. However, in some cases, an AP 105 may be the same entity as, or may include, the controller 210-*a*. In these cases, for example, as described with reference to FIG. 4, one or both of an AP 105-*c* and an AP 105-*d* may perform operations described as being performed by the controller 210-*a*. As such, the operations described below as being performed by the controller 210-*a* may be performed by one or both of the AP 105-*c* and the AP 105-*d*. Additionally, the operations described as being performed by the AP 105-*c* of the first BSS may be similarly or alternatively performed by the AP 105-*d* of the second BSS.

At 305, the controller 210-*a* may determine transmission parameters. Determining the transmission parameters may include determining one or more first transmission parameters for a first trigger transmission from the AP 105-*c*. Determining the transmission parameters may also include determining one or more second transmission parameters for a second trigger transmission from the AP 105-*d*. The first transmission parameters and the second transmission parameters may include a transmission order for the first and the second trigger transmissions. For example, the transmission order may specify a time of the second trigger transmission to be transmitted from the AP 105-*d* to the STA 115-*d* relative to a time of the first trigger transmission to be transmitted from the AP 105-*c* to the STA 115-*c*.

The first transmission parameters may include a first transmission bandwidth for the first trigger transmission to be transmitted from the AP 105-*c* to the STA 115-*c*, and the second transmission parameters may include a second transmission bandwidth for the second trigger transmission to be transmitted from the AP 105-*d* to the STA 115-*d*. In some cases, the second transmission bandwidth may not overlap with the first transmission bandwidth. In such cases, the second transmission bandwidth may be frequency-separated from the second transmission bandwidth.

The first transmission parameters may include a first trigger data precoding for the first trigger transmission to be transmitted to the STA 115-*c*, and the second transmission parameters may include a second trigger data precoding for the second trigger transmission to be transmitted to the STA 115-*d*. The first trigger data precoding and the second trigger data precoding may include trigger data precoding information that includes channel information. Precoding information may include, for example, information relating to phase shifting or power controlling information for the transmitted streams. Additionally or alternatively, the first transmission parameters and the second transmission parameters may include an indication of specific spatial streams for transmitting of the first trigger transmission on a first spatial stream and for transmitting of the second trigger transmission on a second spatial stream.

At 310, the controller 210-*a* may determine a reference time. Determining the reference time may include determining a first reference time for the first trigger transmission. Determining the reference time may include determining a second reference time for the second trigger transmission. In some implementations, the first reference time and the second reference time may be the same, for example, in the case of frequency-separated triggers or spatially-separated triggers. In other implementations, the first reference time and the second reference time may be different, and separated by a time ($t_A$), for example, in the case of time-separated triggers. The time ($t_A$) may indicate a time for the AP 105-*d* to wait before transmitting a second-ordered trigger transmission, providing for a time separation between the first and second trigger transmissions.

At 315, the controller 210-*a* may transmit to the AP 105-*c* (and the AP 105-*c* may receive from the controller 210-*a*), an indication of the one or more first transmission parameters, as may have been determined at 305, and an indication of the reference time, as may have been determined at 310, for the first trigger transmission. The transmitting at 315 may include transmitting an indication of the first transmission parameters and an indication of the reference time for the first trigger transmission to the AP 105-*c* in the first BSS to synchronize a first synchronized transmission from the STA 115-*c* with a second synchronized transmission from the STA 115-*d*. The controller 210-*a* may further transmit to the AP 105-*c* (and the AP 105-*c* may receive from the controller 210-*a*) an indication of a first spatial stream for transmitting the first trigger transmission on the first spatial stream. Additionally or alternatively, the controller 210-*a* may transmit to the AP 105-*c* other trigger information including trigger data precoding information and channel information that the AP 105-*c* may use to determine the first spatial stream.

At 320, the AP 105-*c* may determine one or more first transmission parameters for one or more first trigger transmissions to be transmitted by the AP 105-*c*. Determining the first transmission parameters may be based on the indications of the first transmission parameters for the first trigger transmission, as may have been received, for example, at 315. In some such implementations, the first transmission parameters determined by the AP 105-*c* at 320 may be identical to the first transmission parameters determined by the controller 210-*a* at 305. The first transmission parameters may include a transmission order for the first trigger transmission to be transmitted to the STA 115-*c* relative to the second trigger transmission to be transmitted to the STA 115-*d*. The first transmission parameters may include a first transmission bandwidth for the first trigger transmission to be transmitted to the STA 115-*c* relative to a second transmission bandwidth for the second trigger transmission to be transmitted to the STA 115-*d* from the AP 105-*d*. In some cases, the second transmission bandwidth may not overlap with the first transmission bandwidth. In such cases, the second transmission bandwidth may be frequency-separated from the second transmission bandwidth.

Determining the first transmission parameters at 320 (for example, based on the received indication of one or more transmission parameters) may include determining a first trigger data precoding for the first trigger transmission to be transmitted to the STA 115-*c*. Determining the first trigger data precoding information may include computing a transmission stream based on the received trigger data precoding information, as may have been received from the controller 210-*a* at 315. Additionally or alternatively, determining the first trigger data precoding information may be based on an indication of a first spatial stream, as may have been received from the controller 210-*a* at 315. Additionally or alternatively, determining the first trigger data precoding information may be based on channel information determined by the AP 105-*c* itself, or channel information received from the controller 210-*a* at 315. At 325, the AP 105-*c* may determine a reference time. Determining the reference time may include determining a first reference time for a first trigger transmission. The AP 105-*c* may determine the reference time at 325 based on the indication of the first reference time for the first trigger transmission, as may have been received from the controller 210-*a* at 315.

The controller 210-*a* may further transmit to the AP 105-*c* (and the AP 105-*c* may receive from the controller 210-*a*) an indication of a first spatial stream for transmitting the first trigger transmission on the first spatial stream. Additionally or alternatively, the controller 210-*a* may transmit to the AP 105-*c* other trigger information including trigger data precoding information and channel information that the AP 105-*c* may use to determine the first spatial stream.

At 330, the controller 210-*a* may transmit to the AP 105-*d* (and the AP 105-*d* may receive from the controller 210-*a*) an indication of one or more second transmission parameters and an indication of a reference time for the second trigger transmission. Transmitting the indication of the one or more second transmission parameters may include transmitting the indication of the one or more second transmission parameters to the AP 105-*d* based on the one or more second transmission parameters as may have been determined at 305. Transmitting the indication of the reference time may include transmitting an indication of a second reference time to the AP 105-*d*, as may have been determined at, for example, 310, for the second trigger transmission. The transmitting at 330 of the one or more second transmission parameters and the reference time for the second trigger transmission to the AP 105-*d* in the second BSS enables the AP 105-*d* to synchronize a second synchronized transmission from the STA 115-*d* with the first synchronized transmission from the STA 115-*c*. The controller 210-*a* may further transmit to the AP 105-*d*, and the AP 105-*d* may receive from the controller 210-*a*, an indication of a second spatial stream for transmitting the second trigger transmission on the second spatial stream. Additionally or alternatively, the controller 210-*a* may transmit to the AP 105-*d* trigger data precoding information and channel information that the AP 105-*d* may use to determine the second spatial stream. In some cases, transmitting the indication of transmission parameters and the indication of the reference time at 330 may be performed simultaneously with or concurrently with transmitting the indication of the one or more first transmission parameters and the indication of the reference time at 315.

At 335, the AP 105-*d* may determine one or more transmission parameters. Determining the transmission parameters may be based on the indication of the second transmission parameters, as may have been received at 330. Determining the transmission parameters at the AP 105-*d* may otherwise be performed similarly as described for the AP 105-*c* determining transmission parameters at 320. In some cases, the AP 105-*d* determining the one or more transmission parameters at 335 may be performed in parallel (for example, during an overlapping period) with the AP 105-*c* determining the one or more first transmission parameters at 320.

At 340, the AP 105-d may determine a reference time. The AP 105-d determining the reference time at 340 may include determining the second reference time for the second trigger transmission. Determining the reference time may be based on the indication of the second reference time, as may have been received at 330. Determining the reference time at the AP 105-d may be performed similarly as described for the AP 105-c determining the reference time for the first trigger transmission at 325. In some cases, the AP 105-d determining the reference time for the second trigger transmission at 340 may be performed in parallel (for example, during an overlapping period) with the AP 105-c determining the reference time for the first trigger transmission at 325.

At 345, the AP 105-c may transmit to the STA 115-c, and the STA 115-c may receive from the AP 105-c, a trigger transmission (that is, a trigger, or a trigger frame). Transmitting the trigger transmission may include transmitting a first trigger transmission to the STA 115-c based on the first transmission parameters as may have been determined at 320. The AP 105-c may transmit the trigger transmission at the first reference time, based on, for example, the first reference time, as may have been determined at 325.

At 350, the STA 115-c may transmit to the AP 105-c, and the AP 105-c may receive from the STA 115-c, a synchronized transmission. Receiving the synchronized transmission may include receiving a first synchronized transmission at a first time from the STA 115-c based on the first trigger transmission, as may have been transmitted at 345. The first synchronized transmission may be synchronized with a second synchronized transmission, at the first time, as may be transmitted from the STA 115-d to the AP 105-d at 360. For example, the first time may be indicated by the first and the second trigger transmissions.

At 355, the AP 105-d may transmit to the STA 115-d, and the STA 115-d may receive from the AP 105-d, a trigger transmission (that is, a trigger, or a trigger frame). Transmitting the trigger transmission may include transmitting a second trigger transmission to the STA 115-d based on the second transmission parameters, as may have been determined at 335. The AP 105-d may transmit the trigger transmission at the first reference time, based on, for example, the first reference time, as may have been determined at 325. Alternatively, the AP 105-d may transmit the trigger transmission at the second reference time, after waiting a time ($t_A$), for example, in the case of time-separated triggers.

At 360, the STA 115-d may transmit to the AP 105-d, and the AP 105-d may receive from the STA 115-d, a synchronized transmission. Receiving the synchronized transmission may include receiving a second synchronized transmission at the first time from the STA 115-c based on the second trigger transmission, as may have been transmitted at 355. The second synchronized transmission may be synchronized with the first synchronized transmission, at the first time, as may have been transmitted from the STA 115-c to the AP 105-c at 350.

Figure 4:
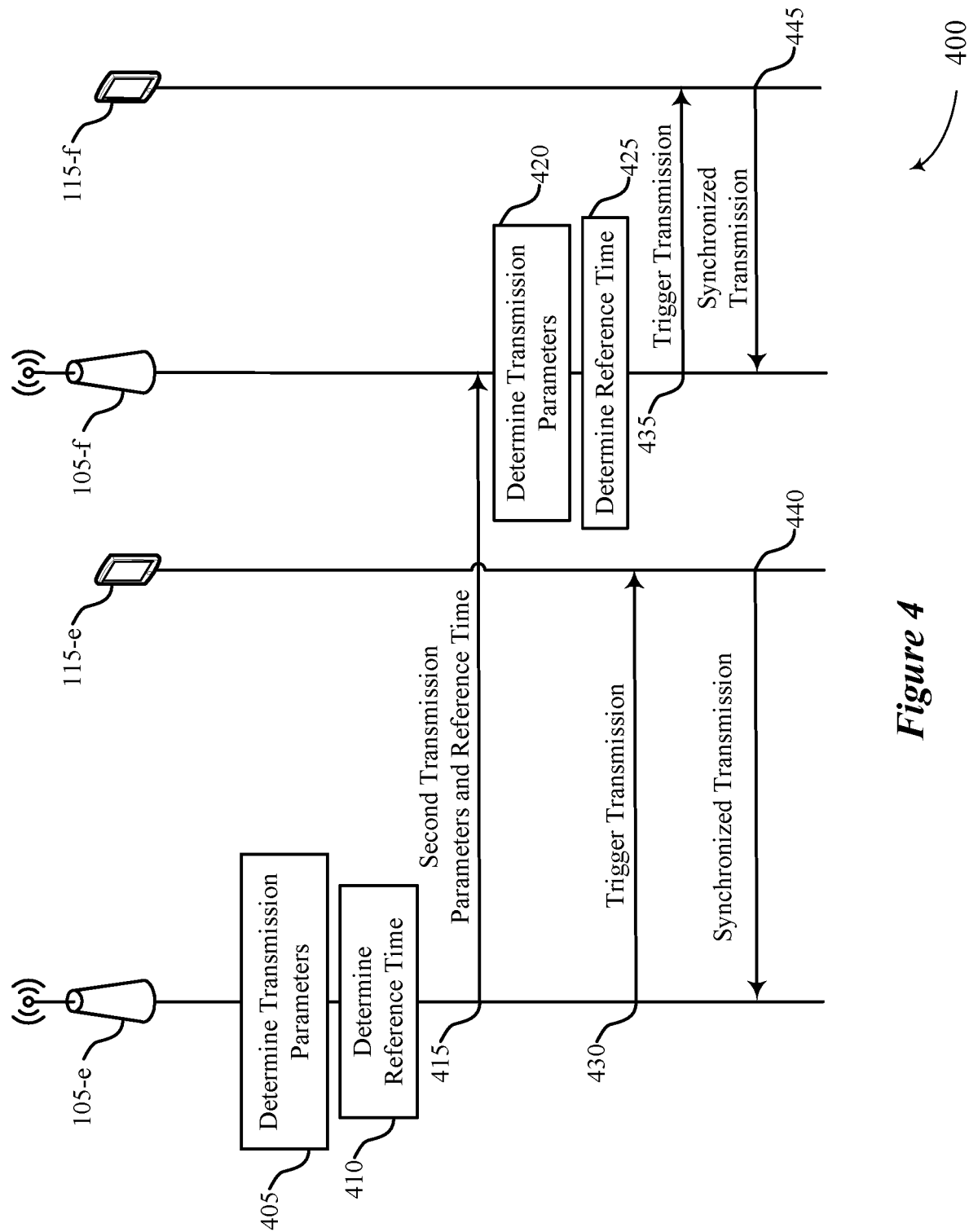

FIG. 4 illustrates examples of a process flow 400 that support multi-BSS time alignment in accordance with various aspects of the present disclosure. In some implementations, the process flow 400 may implement aspects of the wireless communications systems 100 and 200. The process flow 400 may include operations by an AP 105-e of a first BSS, an AP 105-f of a second BSS, a STA 115-e of a set of STAs in the first BSS, and a STA 115-f of a set of STAs in the second BSS. Each of these devices may be examples of the corresponding devices as described with reference to FIGS. 1 and 2.

FIG. 4 illustrates an implementation in which an AP 105 is the same entity as, or includes, the controller 210-a. In this implementation, one or both of the AP 105-e and the AP 105-f may perform operations described as being performed by the controller 210-a. As such, the operations described below as being performed by the AP 105-e may additionally or alternatively be performed by the AP 105-f, and vice-versa.

At 405, the AP 105-e may determine transmission parameters. Determining the transmission parameters may include determining one or more first transmission parameters for a first trigger transmission from the AP 105-e. Determining the transmission parameters may also include determining one or more second transmission parameters for a second trigger transmission from the AP 105-f. The first transmission parameters and the second transmission parameters may include a transmission order for the first and the second trigger transmissions. For example, the transmission order may specify a time of the second trigger transmission to be transmitted from the AP 105-f to the STA 115-f relative to a time of the first trigger transmission to be transmitted from the AP 105-e to the STA 115-e.

The first transmission parameters may include a first transmission bandwidth for the first trigger transmission to be transmitted from the AP 105-e to the STA 115-e, and the second transmission parameters may include a second transmission bandwidth for the second trigger transmission to be transmitted from the AP 105-f to the STA 115-f In some cases, the second transmission bandwidth may not overlap with the first transmission bandwidth. In such cases, the second transmission bandwidth may be frequency-separated from the second transmission bandwidth.

Determining the first transmission parameters may include determining a first trigger data precoding for the first trigger transmission to be transmitted to the STA 115-e, and determining the second transmission parameters may include determining a second trigger data precoding for the second trigger transmission to be transmitted from the AP 105-f to the STA 115-f The first trigger data precoding and the second trigger data precoding may include trigger data precoding information that includes channel information. Precoding information may include, for example, information relating to phase shifting or power controlling information for the transmitted streams. Determining the first and/or second trigger data precoding information may include computing a transmission stream based on the trigger data precoding information and channel information. In some cases, the first transmission parameters may include a specific spatial stream for the AP 105-e to transmit the first trigger transmission on a first spatial stream, and the second transmission parameters may include an indication of a specific spatial stream for the AP 105-f to transmit the second trigger transmission on a second spatial stream. Determining the trigger data precoding information may be based on channel information determined by the AP 105-e itself, or channel information received from another device (for example, a controller).

At 410, the AP 105-e may determine a reference time. Determining the reference time may include determining a first reference time for the first trigger transmission. Determining the reference time may additionally or alternatively include determining a second reference time for the second trigger transmission. In some implementations, the first reference time and the second reference time may be the same, for example, in the case of frequency-separated triggers or spatially-separated triggers. In other implementations, the first reference time and the second reference time may be different, and separated by a time ($t_A$), for example, in the case of time-separated triggers. The time ($t_A$) may indicate a time for the AP 105-*f* to wait before transmitting a second-ordered trigger transmission, providing for a time separation between the first and second trigger transmissions.

At 415, the AP 105-*e* may transmit to the AP 105-*f*, and the AP 105-*f* may receive from the AP 105-*e*, an indication of one or more transmission parameters and an indication of the reference time for the second trigger transmission. The transmitting may include transmitting an indication of the one or more second transmission parameters, as may have been determined at 405, and an indication of the second reference time, as may have been determined at 410, for the second trigger transmission for AP 105-*f* to synchronize the second synchronized transmission from the STA 115-*f* with the first synchronized transmission from the STA 115-*e*. The AP 105-*e* may further transmit to the AP 105-*f*, and the AP 105-*f* may receive from the AP 105-*e*, an indication of a second spatial stream for transmitting the second trigger transmission on the second spatial stream. Additionally or alternatively, the AP 105-*e* may transmit to the AP 105-*f* trigger data precoding information and channel information that the AP 105-*f* may use to determine the second spatial stream.

At 420, the AP 105-*f* may determine transmission parameters. Determining the transmission parameters may include determining one or more second transmission parameters for the second trigger transmission based on the indication of the second transmission parameters for the second trigger transmission, as may have been received, for example, at 415. The second transmission parameters may include a transmission order for the second trigger transmission to be transmitted to the STA 115-*f* relative to the first trigger transmission to be transmitted to the STA 115-*e* from the AP 105-*e*. The second transmission parameters may include a second transmission bandwidth for the second trigger transmission to be transmitted to the STA 115-*f* relative to a first transmission bandwidth for the first trigger transmission to be transmitted to the STA 115-*e* from the AP 105-*e*.

Determining the second transmission parameters (for example, based on the received indication of one or more transmission parameters) may include determining a second trigger data precoding for the second trigger transmission to be transmitted to the STA 115-*f*. Determining the second trigger data precoding information may include computing a transmission stream based on the received trigger data precoding information and channel information, as may have been received from the AP 105-*e* at 415. Additionally or alternatively, determining the second trigger data precoding information may be based on an indication of a second spatial stream, as may have been received from the AP 105-*e* at 415.

At 425, the AP 105-*f* may determine a reference time. Determining the reference time may include determining the second reference time for the second trigger transmission. The AP 105-*f* may determine the reference time based on the indication of the second reference time for the second trigger transmission, as may have been received from the AP 105-*e* at 415.

At 430, the AP 105-*e* may transmit to the STA 115-*e*, and the STA 115-*e* may receive from the AP 105-*e*, a trigger transmission (that is, a trigger, or trigger frame). Transmitting the trigger transmission may include transmitting a first trigger transmission to the STA 115-*e* based on the first transmission parameters as may have been determined at 405. The AP 105-*e* may transmit the trigger transmission at the first reference time, based on, for example, the first reference time, as may have been determined at 410.

At 440, the STA 115-*e* may transmit to the AP 105-*e*, and the AP 105-*e* may receive from the STA 115-*e*, a synchronized transmission. Receiving the synchronized transmission may include receiving a first synchronized transmission at a first time from the STA 115-*e* based on the first trigger transmission as may have been transmitted at 430. The first synchronized transmission may be synchronized with a second synchronized transmission, at the first time, as may be transmitted from the STA 115-*f* to the AP 105-*f* at 445. For example, the first time may be indicated by the first and the second trigger transmissions.

At 435, the AP 105-*f* may transmit to the STA 115-*f*, and the STA 115-*f* may receive from the AP 105-*f*, a trigger transmission (that is, a trigger, or trigger frame). Transmitting the trigger transmission may include transmitting a second trigger transmission to the STA 115-*f* based on the second transmission parameters as may have been determined at 420. The AP 105-*f* may transmit the trigger transmission at the first reference time, based on, for example, the first reference time, as may have been determined at 425. Alternatively, the AP 105-*f* may transmit the second trigger transmission at the second reference time, after waiting a time ($t_A$), for example, in the case of time-separated triggers.

At 445, the STA 115-*f* may transmit to the AP 105-*f*, and the AP 105-*f* may receive from the STA 115-*f*, a synchronized transmission. Receiving the synchronized transmission may include receiving a second synchronized transmission at the first time from the STA 115-*f* based on the second trigger transmission as may have been transmitted at 435. The second synchronized transmission may be synchronized with the first synchronized transmission, at the first time, as may be transmitted from the STA 115-*e* to the AP 105-*e* at 440.

Figure 5:
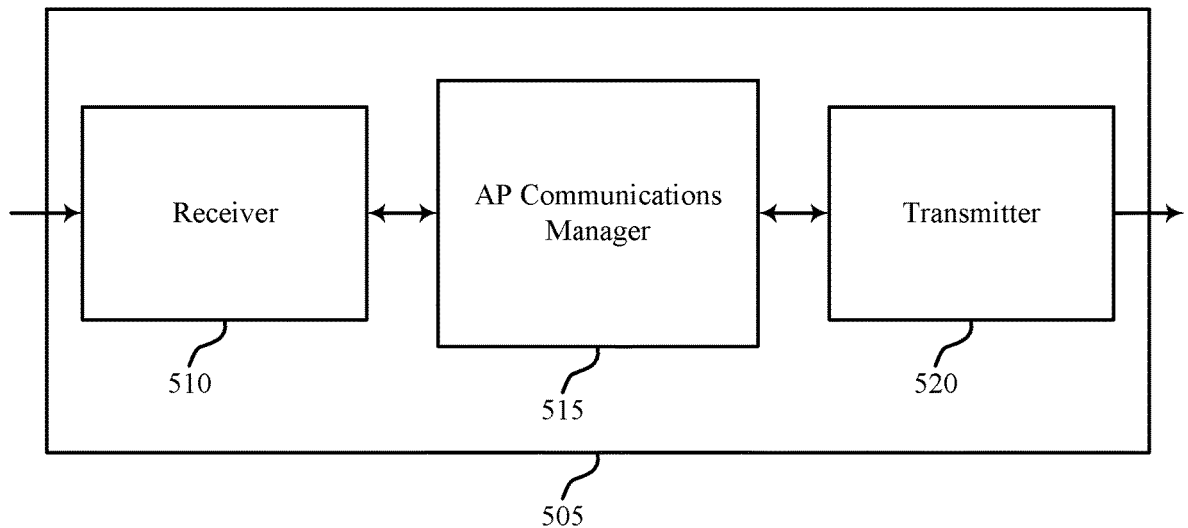
FIGS. 5-6 illustrate block diagrams of wireless devices that support multi-BSS time alignment in accordance with various aspects of the present disclosure.

FIG. 5 shows a block diagram 500 of a wireless device 505 that supports multi-BSS time alignment in accordance with various aspects of the present disclosure. The wireless device 505 may be an example of aspects of an access point (AP) 105 as described herein. The wireless device 505 may include a receiver 510, an AP communications manager 515, and a transmitter 520. The wireless device 505 may also include a processor. Each of these components may be in communication with one another (for example, via one or more buses).

The receiver 510 may receive information such as packets, user data, or control information associated with various information channels (for example, control channels, data channels, and information related to multi-BSS uplink time alignment, etc.). Information may be passed on to other components of the device. The receiver 510 may be an example of aspects of the transceiver 730 as described with reference to FIG. 7. The receiver 510 may utilize a single antenna or a set of antennas.

The AP communications manager 515 may be an example of aspects of the AP communications module 760 as described with reference to FIG. 7. The AP communications manager 515 and/or at least some of its various sub-components may be implemented in hardware, software executed by a processor, firmware, or any combination thereof. If implemented in software executed by a processor, the functions of the AP communications manager 515 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The AP communications manager 515 and/or at least some of its various sub-components may be physically located at different locations, including being distributed such that portions of functions are implemented at different physical locations by one or more physical devices. In some implementations, the AP communications manager 515 and/or at least some of its various sub-components may be a separate and distinct component in accordance with various aspects of the present disclosure. In other implementations, the AP communications manager 515 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The AP communications manager 515 may determine one or more first transmission parameters for a first trigger transmission, transmit (or cause to be transmitted) the first trigger transmission to one or more first STAs of a first set of STAs in a first BSS based on the first transmission parameters, and receive one or more first synchronized transmissions at a first time from one or more of the first STAs based on the first trigger transmission. In some cases, the first synchronized transmissions may be synchronized with one or more second synchronized transmissions at the first time from one or more second STAs of a second set of STAs in a second BSS.

The transmitter 520 may transmit signals generated by other components of the device. In some implementations, the transmitter 520 may be collocated with the receiver 510 in a transceiver module. For example, the transmitter 520 may be an example of aspects of the transceiver 730 as described with reference to FIG. 7. The transmitter 520 may utilize a single antenna or a set of antennas.

Figure 6:
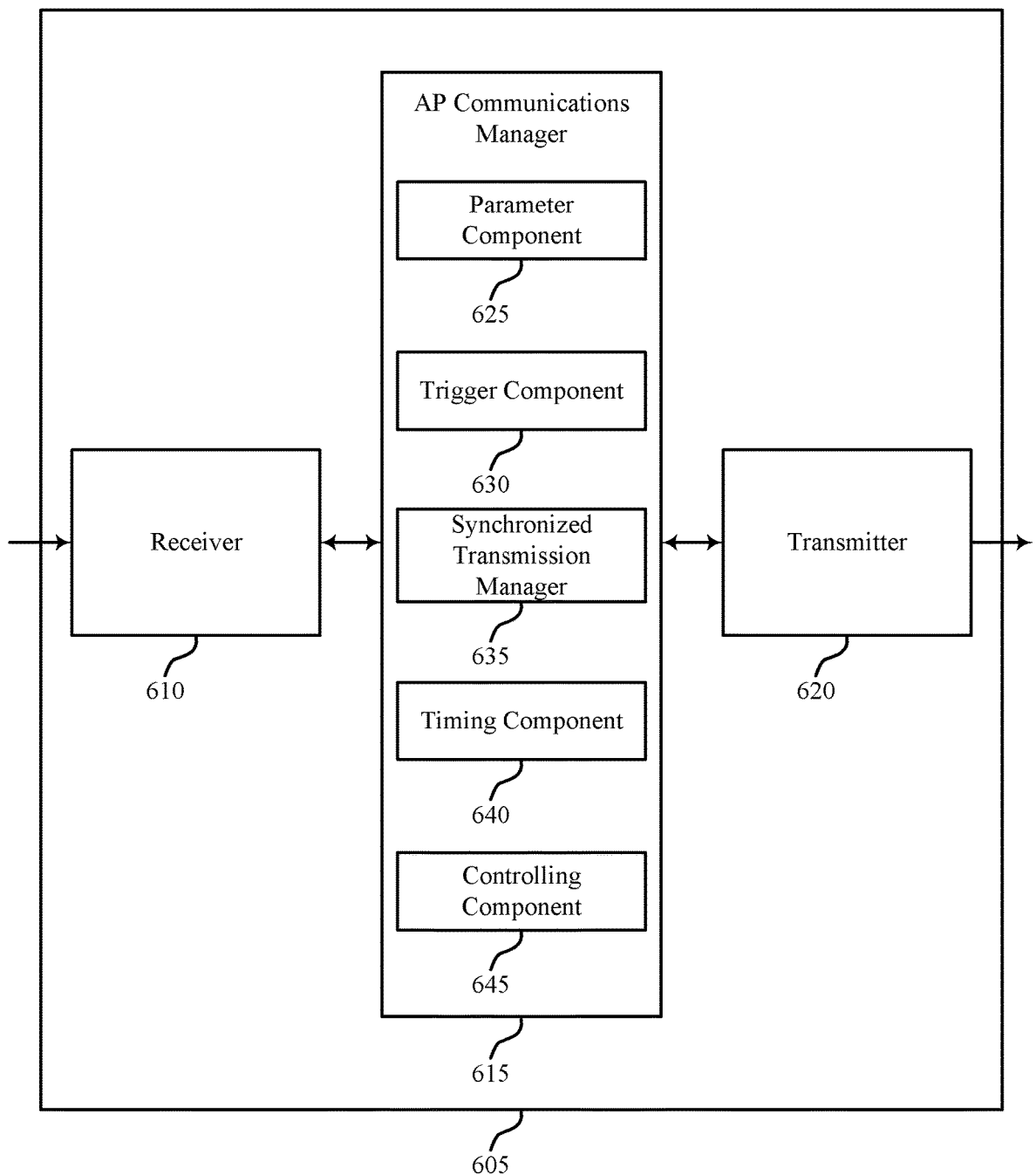

FIG. 6 shows a block diagram 600 of a wireless device 605 that supports multi-BSS time alignment in accordance with various aspects of the present disclosure. The wireless device 605 may be an example of aspects of a wireless device 505, or an AP 105, as described with reference to FIG. 5. The wireless device 605 may include a receiver 610, an AP communications manager 615, and a transmitter 620. The wireless device 605 may also include a processor. Each of these components may be in communication with one another (for example, via one or more buses).

The receiver 610 may receive information such as packets, user data, or control information associated with various information channels (for example, control channels, data channels, and information related to multi-BSS time alignment, etc.). Information may be passed on to other components of the device. For example, the receiver 610 may receive one or more first synchronized transmissions at a first time from one or more first STAs of a first BSS and pass the first synchronized transmissions to the synchronized transmission manager 635 as described below. The receiver 610 may be an example of aspects of the transceiver 730 as described with reference to FIG. 7. The receiver 610 may utilize a single antenna or a set of antennas.

The AP communications manager 615 may be an example of aspects of the AP communications module 760 as described with reference to FIG. 7. The AP communications manager 615 may also include a parameter component 625, a trigger component 630, a synchronized transmission manager 635, a parameter component 640, and a trigger component 645.

The parameter component 625 may determine one or more first transmission parameters for a first trigger transmission to be transmitted by the wireless device 605 to the one or more first STAs of the first BSS. In some cases, the parameter component 625 may receive, from a controller, an indication of one or more of the first transmission parameters, where determining the first transmission parameters may be based on the indication of the first transmission parameters. In some implementations, the first transmission parameters may include a transmission order for the first trigger transmission relative to a second trigger transmission to be transmitted from a second AP to one or more second STAs of a second BSS. In some cases, the first transmission parameters may include a first transmission bandwidth for the first trigger transmission. In some cases, the first transmission parameters may include a first trigger data precoding for the first trigger transmission. In some implementations, the parameter component 625 may receive, from a controller, trigger data precoding information that includes channel information, where determining the first trigger data precoding may include computing a transmission stream based on the channel information. Additionally or alternatively, the parameter component 625 may receive, from a controller, an indication of a first spatial stream, where transmitting the first trigger transmission to the first STAs may include transmitting on the first spatial stream.

In some implementations in which the wireless device 605 is configured to act as a controller, the parameter component 625 may determine one or more second transmission parameters for a second trigger transmission to be transmitted from a second AP to one or more second STAs. In some cases, the second transmission parameters may include a transmission order for the second trigger transmission to be transmitted to the one or more second STAs relative to the first trigger transmission to be transmitted to the one or more first STAs. In some cases, the second transmission parameters may include a second transmission bandwidth for the second trigger transmission. In some cases, the first transmission bandwidth may be frequency-separated from the second transmission bandwidth. In some cases, the second transmission parameters may include a second trigger data precoding for the second trigger transmission. In some cases, the second transmission parameters may additionally include a second reference time at which the second AP is to transmit the second trigger transmission.

The trigger component 630 may generate the first trigger transmission based on the first transmission parameters and cause the transmitter 620 to transmit the first trigger transmission to the one or more first STAs of the first BSS at the first reference time.

As described above with reference to the receiver 610, the synchronized transmission manager 635 may receive, from the receiver, one or more first synchronized transmissions at a first time from the one or more first STAs of the first BSS based on the first trigger transmission, where the first synchronized transmissions may be synchronized with one or more second synchronized transmissions at the first time from the one or more second STAs of the second BSS.

The timing component 640 may determine the first reference time for the first trigger transmission. In some implementations in which the wireless device 605 is configured to act as a controller, the timing component also may determine a second reference time for a second trigger transmission to be transmitted by the second AP. In some cases, the first reference time and the second reference time may be different, for example, separated by a time difference $t_A$ to provide for temporally-separated first and second triggers.

In some implementations in which the wireless device 605 is configured to act as a controller, the controlling component 645 may cause the transmitter 620 to transmit an indication of the second transmission parameters and an indication of the second reference time for the second trigger transmission to the second AP in the second BSS.

The transmitter 620 may transmit signals generated by other components of the device. As described above, the transmitter 620 may transmit the first trigger transmission to the one or more first STAs of the first BSS at the first reference time responsive to the trigger component 630. As is also described above, in implementations in which the wireless device 605 is configured to act as a controller, the transmitter 620 may transmit the one or more second transmission parameters to the second AP, respectively responsive to the controlling component 645. In some implementations, the transmitter 620 may be collocated with the receiver 610 in a transceiver module. For example, the transmitter 620 may be an example of aspects of the transceiver 730 as described with reference to FIG. 7. The transmitter 620 may utilize a single antenna or a set of antennas.

Figure 7:
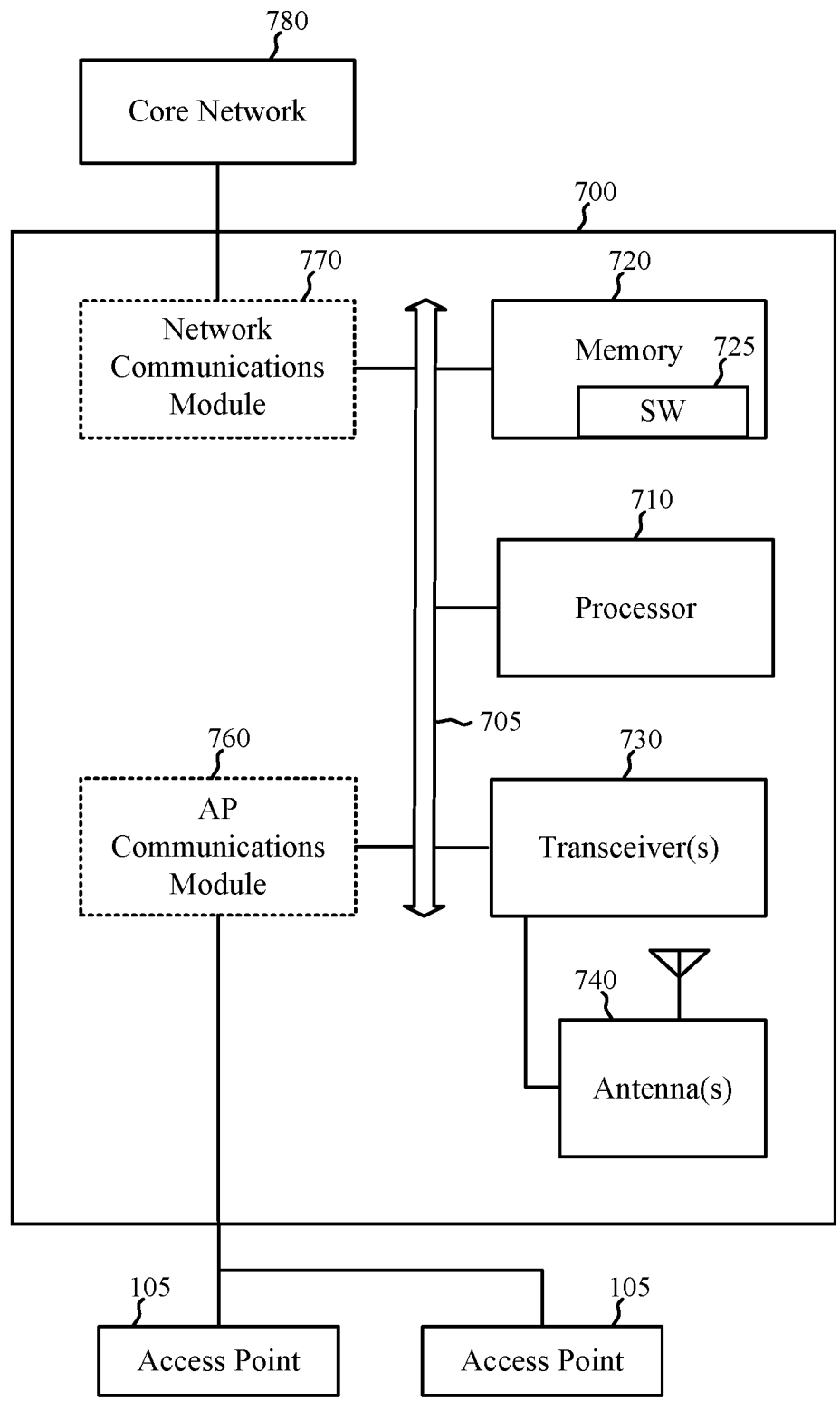
FIG. 7 illustrates a block diagram of an access point (AP) that supports multi-BSS time alignment in accordance with various aspects of the present disclosure.

FIG. 7 illustrates a block diagram of an AP 700 that supports multi-BSS time alignment in accordance with various aspects of the present disclosure. For example, the AP 700 may be an example of aspects of an AP 105 as described with reference to FIGS. 1 and 2. The AP 700 may be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The AP 700 includes a processor 710, a memory 720, at least one transceiver 730, and at least one antenna 740. In some implementations, the AP 700 also includes one or both of an AP communications module 760 and a network communications module 770. Each of the components (or "modules") as described with reference to FIG. 7 may communicate with one another, directly or indirectly, over at least one bus 705.

The memory 720 may include random access memory (RAM) and read-only memory (ROM). The memory 720 also may store processor- or computer-executable software (SW) code 725 containing instructions that, when executed by the processor 710, cause the processor to perform various functions described herein for wireless communication, including generation and transmission of a downlink frame and reception of an uplink frame. The SW code 725 may further include code to implement aspects of the present disclosure, including code to support multi-BSS uplink time alignment. The SW code 725 may be stored in a non-transitory computer-readable medium such as system memory or other memory.

The processor 710 may include an intelligent hardware device such as, for example, a central processing unit (CPU), a microcontroller, an ASIC, or a programmable logic device (PLD) such as a FPGA, among other possibilities. The processor 710 may be configured to execute computer-readable instructions stored in a memory to perform various functions (such as functions or tasks supporting flow controlling the network stack). The processor 710 processes information received through the transceiver 730, the AP communications module 760, and the network communications module 770. The processor 710 also may process information to be sent to the transceiver 730 for transmission through the antenna 740, information to be sent to the AP communications module 760, and information to be sent to the network communications module 770. The processor 710 may generally be configured to perform various operations related to generating and transmitting a downlink frame and receiving an uplink frame.

The transceiver 730 may include a modem to modulate packets and provide the modulated packets to the antenna 740 for transmission, as well as to demodulate packets received from the antenna 740. The transceiver 730 may be implemented as at least one RF transmitter and at least one separate RF receiver. The transceiver 730 may communicate bi-directionally, via the antenna 740, with at least one station 115, for example, as described with reference to FIGS. 1 and 2. Although only one transceiver 730 and one antenna 740 are shown in FIG. 7, the AP 700 may typically include multiple transceivers 730 and antennas 740. For example, in some AP implementations, the AP 700 may include multiple transmit antennas (each with a corresponding transmit chain) and multiple receive antennas (each with a corresponding receive chain). The AP 700 may communicate with a core network 780 through the network communications module 770. The system also may communicate with other APs, such as the APs 105, using the communications module 760.

Figure 8:
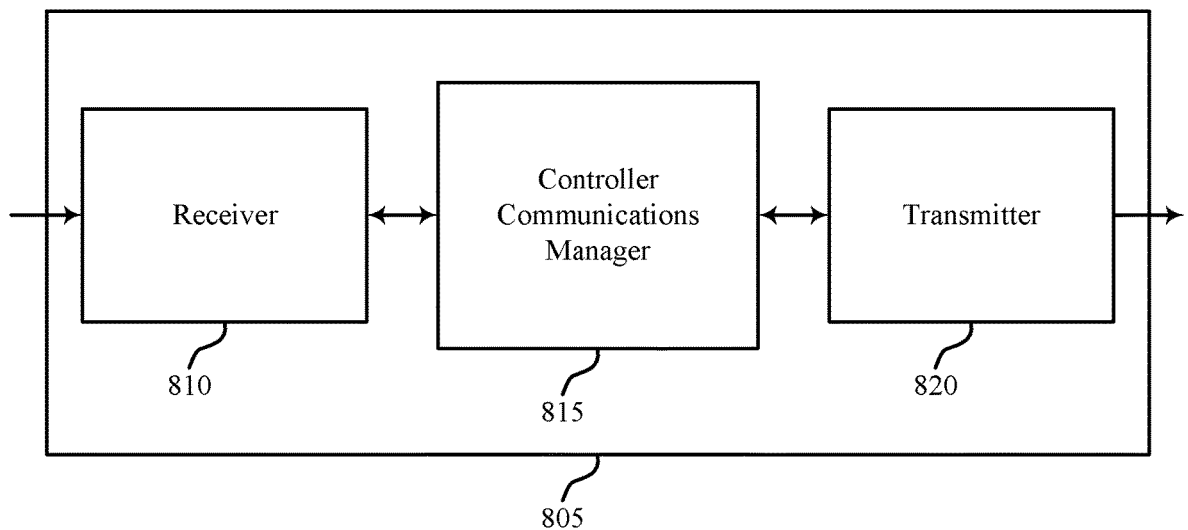
FIG. 8-9 illustrate block diagrams of wireless devices that support multi-BSS time alignment in accordance with various aspects of the present disclosure.

FIG. 8 shows a block diagram 800 of a wireless device 805 that supports multi-BSS time alignment in accordance with various aspects of the present disclosure. The wireless device 805 may be an example of aspects of the controller 210 as described with reference to FIG. 2. The wireless device 805 may include a receiver 810, a controller communications manager 815, and a transmitter 820. The wireless device 805 may also include a processor. Each of these components may be in communication with one another (for example, via one or more buses).

The receiver 810 may receive information such as packets, user data, or control information associated with various information channels (for example, control channels, data channels, and information related to multi-BSS uplink time alignment, etc.). Information may be passed on to other components of the device. The receiver 810 may be an example of aspects of the transceiver 730 as described with reference to FIG. 7. The receiver 810 may utilize a single antenna or a set of antennas.

The controller communications manager 815 and/or at least some of its various sub-components may be implemented in hardware, software executed by a processor, firmware, or any combination thereof. If implemented in software executed by a processor, the functions of the controller communications manager 815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The controller communications manager 815 and/or at least some of its various sub-components may be physically located at different locations, including being distributed such that portions of functions are implemented at different physical locations by one or more physical devices. In some implementations, the controller communications manager 815 and/or at least some of its various sub-components may be a separate and distinct component in accordance with various aspects of the present disclosure. In other implementations, the controller communications manager 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The controller communications manager 815 may determine one or more first transmission parameters for a first trigger transmission and determine a first reference time for the first trigger transmission. The controller communications manager 815 may transmit an indication of the first transmission parameters and an indication of the first reference time for the first trigger transmission to a first AP in a first BSS to synchronize one or more first synchronized transmissions from one or more first STAs in a first set of STAs in the first BSS with one or more second synchronized transmissions from one or more second STAs of a second set of STAs in a second BSS.

The transmitter 820 may transmit signals generated by other components of the device. In some implementations, the transmitter 820 may be collocated with the receiver 810 in a transceiver module. For example, the transmitter 820 may be an example of aspects of the transceiver 730 as described with reference to FIG. 7. The transmitter 820 may utilize a single antenna or a set of antennas.

Figure 9:
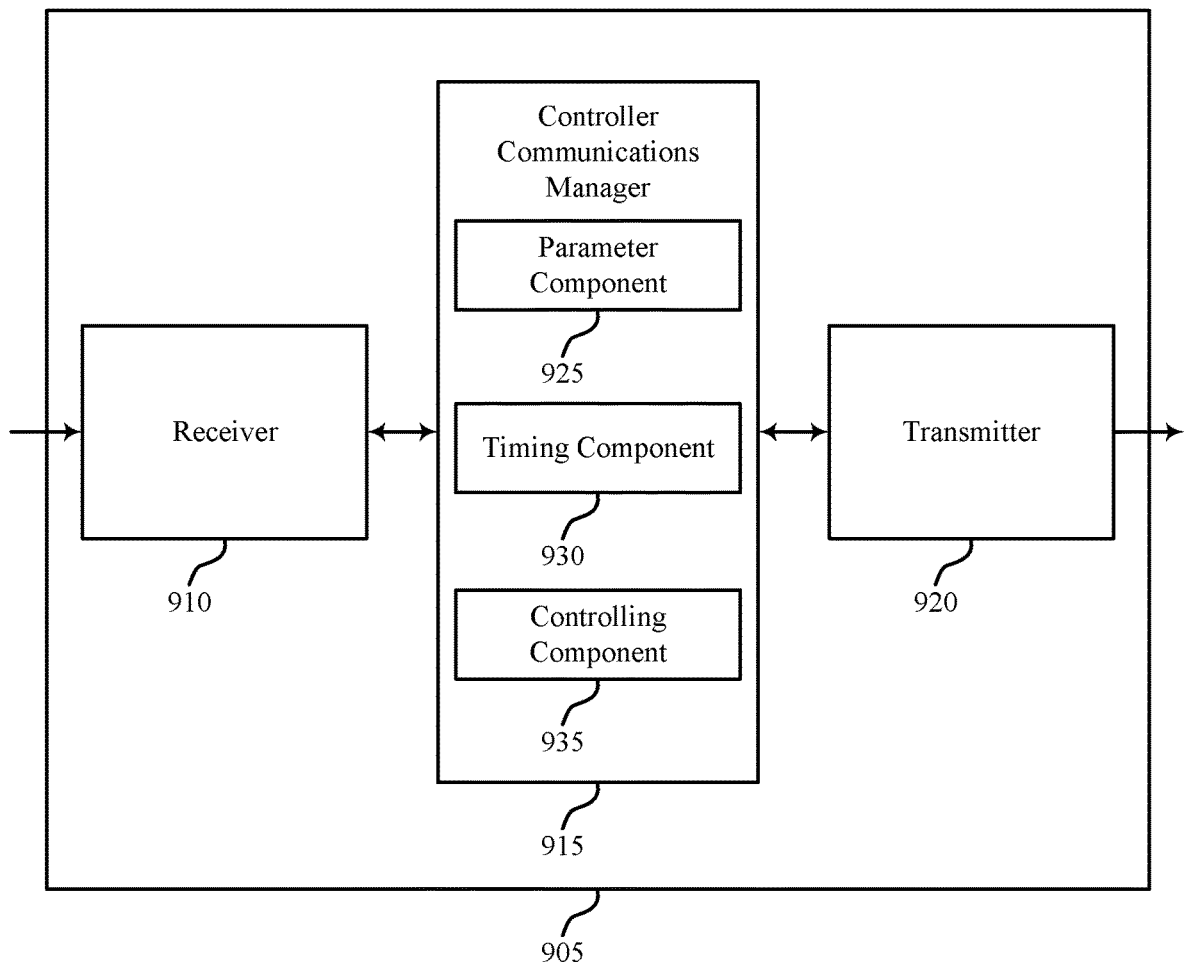

FIG. 9 shows a block diagram 900 of a wireless device 905 that supports multi-BSS time alignment in accordance with aspects of the present disclosure. The wireless device 905 may be an example of aspects of the wireless device 805 or the controller 210 as described with reference to FIGS. 8 and 2, respectively. The wireless device 905 may include a receiver 910, a controller communications manager 915, and a transmitter 920. The wireless device 905 may also include a processor. Each of these components may be in communication with one another (for example, via one or more buses).

The receiver 910 may receive information such as packets, user data, or control information associated with various information channels (for example, control channels, data channels, and information related to multi-BSS uplink time alignment, etc.). Information may be passed on to other components of the device. The receiver 910 may be an example of aspects of the transceiver 730 as described with reference to FIG. 7. The receiver 910 may utilize a single antenna or a set of antennas.

The controller communications manager 915 may be an example of aspects of the controller communications manager 815 as described with reference to FIG. 8. The controller communications manager 915 may also include a parameter component 925, a timing component 930, and a controlling component 935.

The parameter component 925 may determine transmission parameters for trigger transmissions to be transmitted by various APs to synchronize transmissions from STAs associated with the APs. For example, the parameter component 925 may determine one or more first transmission parameters for a first trigger transmission to be transmitted by a first AP to one or more first STAs of a first BSS, and determine one or more second transmission parameters for a second trigger transmission to be transmitted by a second AP to one or more second STAs of a second BSS. In some implementations, the first and the second transmission parameters may include a transmission order for the first and the second trigger transmissions. In some cases, the first transmission parameters may include a first transmission bandwidth for the first trigger transmission and the second transmission parameters may include a second transmission bandwidth, which may be different and non-overlapping with the first transmission bandwidth such that the first transmission bandwidth may be frequency-separated from the second transmission bandwidth. In some cases, the first transmission parameters may include a first trigger data precoding for the first trigger transmission and the second transmission parameters may include a second data precoding for the second trigger transmission. In some implementations, the parameter component 625 may receive, from a controller, trigger data precoding information that includes channel information, where determining the first trigger data precoding may include computing a transmission stream based on the channel information. Additionally or alternatively, the parameter component 625 may receive, from a controller, an indication of a first spatial stream, where transmitting the first trigger transmission to the first STAs may include transmitting on the first spatial stream. In some implementations, the parameter component 925 may determine channel information for at least one of the first AP and the second AP, where the respective trigger data precoding may include the channel information. Alternatively, the parameter component 925 may determine a first spatial stream and a second spatial stream, where the first trigger data precoding may include an indication of the first spatial stream and the second trigger data precoding may include an indication of the second spatial stream.

The timing component 930 may determine a first reference time for the first trigger transmission and determine a second reference time for the second trigger transmission. In some cases, the first reference time and the second reference time may be different, for example, separated by a time difference $t_\Delta$ to provide for temporally-separated first and second triggers.

The controlling component 935 may cause the transmitter 920 to transmit an indication of the one or more first transmission parameters and an indication of the first reference time for the first trigger transmission to the first AP in the first BSS. Similarly, the controlling component 935 may transmit an indication of the second transmission parameters and an indication of the second reference time for the second trigger transmission to the second AP in the second BSS. Providing the transmission parameters and reference times to the first and the second APs enables the controller, via the APs, to synchronize one or more first synchronized transmissions from one or more first STAs in the first BSS with one or more second synchronized transmissions from one or more second STAs in the second BSS.

The transmitter 920 may transmit signals generated by other components of the device. In some implementations, the transmitter 920 may be collocated with the receiver 910 in a transceiver module. For example, the transmitter 920 may be an example of aspects of the transceiver 730 as described with reference to FIG. 7. The transmitter 920 may utilize a single antenna or a set of antennas.

Figure 10:
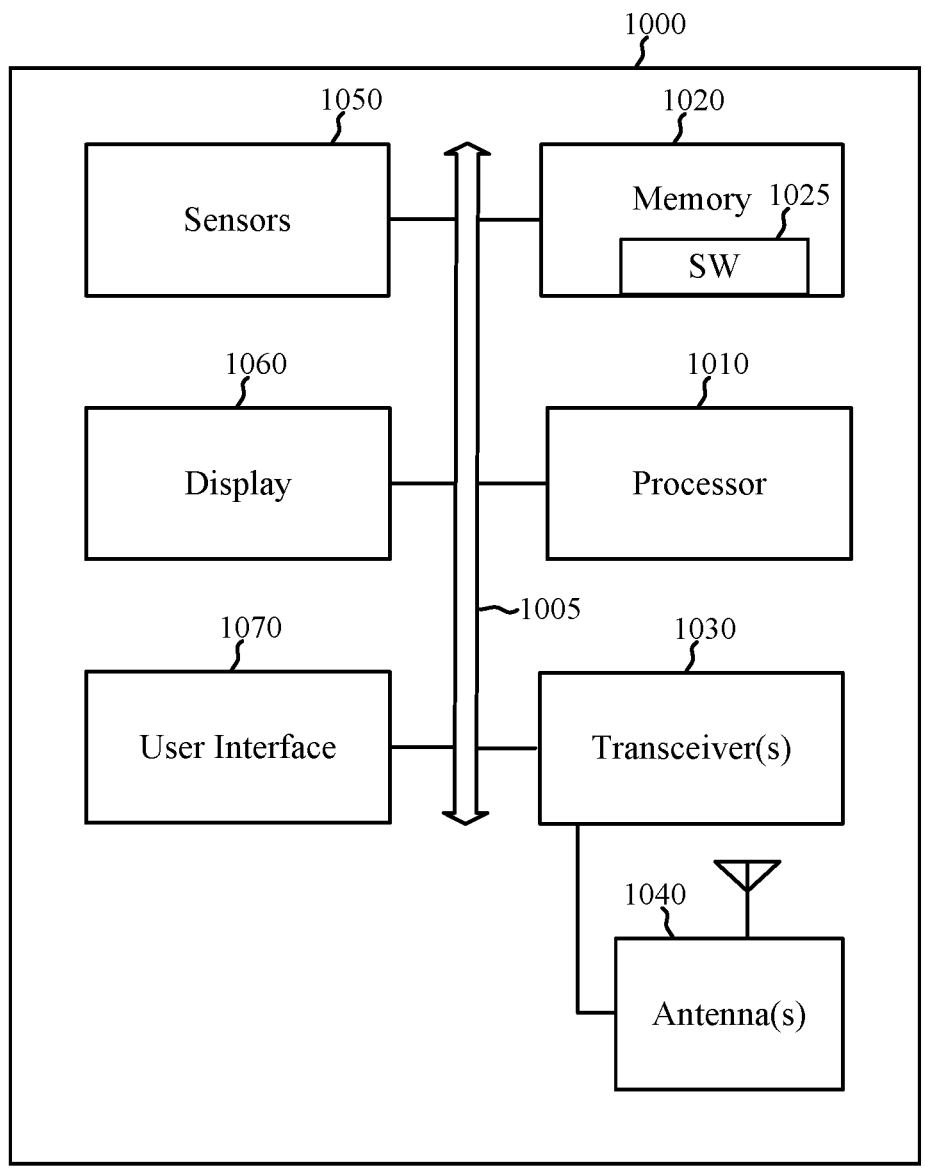
FIG. 10 illustrates a block diagram of a station (STA) that supports multi-BSS time alignment in accordance with various aspects of the present disclosure.

FIG. 10 illustrates a block diagram of a STA 1000 that supports multi-BSS time alignment in accordance with various aspects of the present disclosure. For example, the STA 1000 may be an example of aspects of the STA 105 as described with reference to FIGS. 1 and 2. The STA 1000 may be configured to send and receive WLAN frames (also referred to herein as transmissions or communications) conforming to an IEEE 802.10 standard (such as the 802.10ac or 802.10ax amendments to the 802.10 family of standards), as well as to encode and decode such frames. The STA 1000 includes a processor 1010, a memory 1020, at least one transceiver 1030, and at least one antenna 1040. In some implementations, the STA 1000 may additionally include one or more of sensors 1050, a display 1060, and a user interface (UI) 1070 (such as a touchscreen or keypad). Each of the components (or "modules") as described with reference to FIG. 10 may communicate with one another, directly or indirectly, over at least one bus 1005.

The memory 1020 may include RAM and ROM. The memory 1020 also may store processor- or computer-executable SW code 1025 containing instructions that, when executed, cause the processor 1010 to perform various functions described herein for wireless communication, including reception of a downlink frame and generation and transmission of an uplink frame. The SW code 1025 may further include code to implement aspects of the present disclosure, including code to support multi-BSS uplink time alignment. The SW code 1025 may be stored in a non-transitory computer-readable medium such as system memory or other memory.

The processor 1010 includes an intelligent hardware device such as a CPU, a microcontroller, an ASIC or a PLD such as an FPGA, among other possibilities. The processor 1010 may be configured to execute computer-readable instructions stored in a memory to perform various functions (such as functions or tasks supporting flow controlling the network stack). The processor 1010 processes information received through the transceiver 1030 as well as information to be sent to the transceiver 1030 for transmission through the antenna 1040. The processor 1010 may be configured to perform various operations related to receiving a downlink frame and generating and transmitting an uplink frame.

The transceiver 1030 may include a modem to modulate packets and provide the modulated packets to the antenna 1040 for transmission, as well as to demodulate packets received from the antenna 1040. The transceiver 1030 may be implemented as at least one RF transmitter and at least one separate RF receiver. The transceiver 1030 may communicate bi-directionally, via the antenna 1040, with at least one AP 105, for example, as described with reference to FIGS. 1 and 2. Although only one transceiver 1030 and one antenna 1040 are shown in FIG. 10, the STA 1000 may include two or more antennas. In some implementations, the STA 1000 may include multiple transmit antennas (each with a corresponding transmit chain) and multiple receive antennas (each with a corresponding receive chain).

Figure 11:
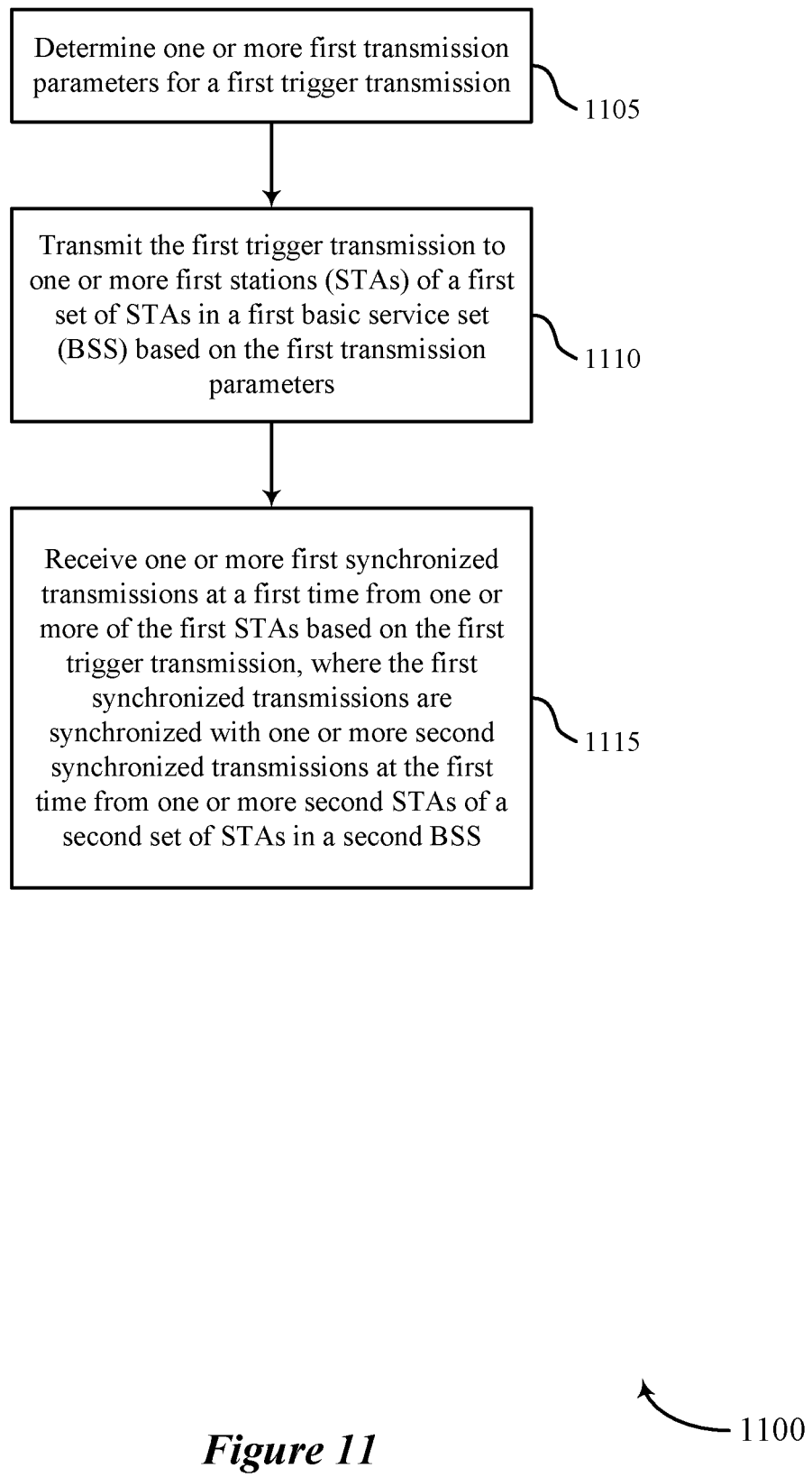
FIGS. 11-17 illustrate methods that support multi-BSS time alignment in accordance with various aspects of the present disclosure.

FIG. 11 shows a flowchart illustrating a method 1100 that supports multi-BSS time alignment in accordance with various aspects of the present disclosure. The operations of the method 1100 may be implemented by an AP 105 or its components as described herein. For example, the operations of method 1100 may be performed by the AP communications manager as described with reference to FIGS. 5 and 6 and the AP communications module as described with reference to FIG. 7. In some implementations, the AP 105 may execute a set of codes to control the functional elements of the device to perform the functions described below. Additionally or alternatively, the AP 105 may perform aspects of the functions described below using special-purpose hardware.

At block 1105, the AP 105 may determine one or more first transmission parameters for a first trigger transmission. In some implementations, aspects of the operations of block 1105 may be performed by a parameter component as described with reference to FIGS. 6 and 9.

At block 1110, the AP 105 may transmit the first trigger transmission to one or more first STAs of a first set of STAs in a first BSS based on the first transmission parameters. In some implementations, aspects of the operations of block 1110 may be performed by a trigger component as described with reference to FIG. 6.

At block 1115, the AP 105 may receive one or more first synchronized transmissions at a first time from one or more of the first STAs based on the first trigger transmission, where the first synchronized transmissions may be synchronized with one or more second synchronized transmissions at the first time from one or more second STAs of a second set of STAs in a second BSS. In some implementations, aspects of the operations of block 1115 may be performed by a synchronized transmission manager as described with reference to FIG. 6.

Figure 12:
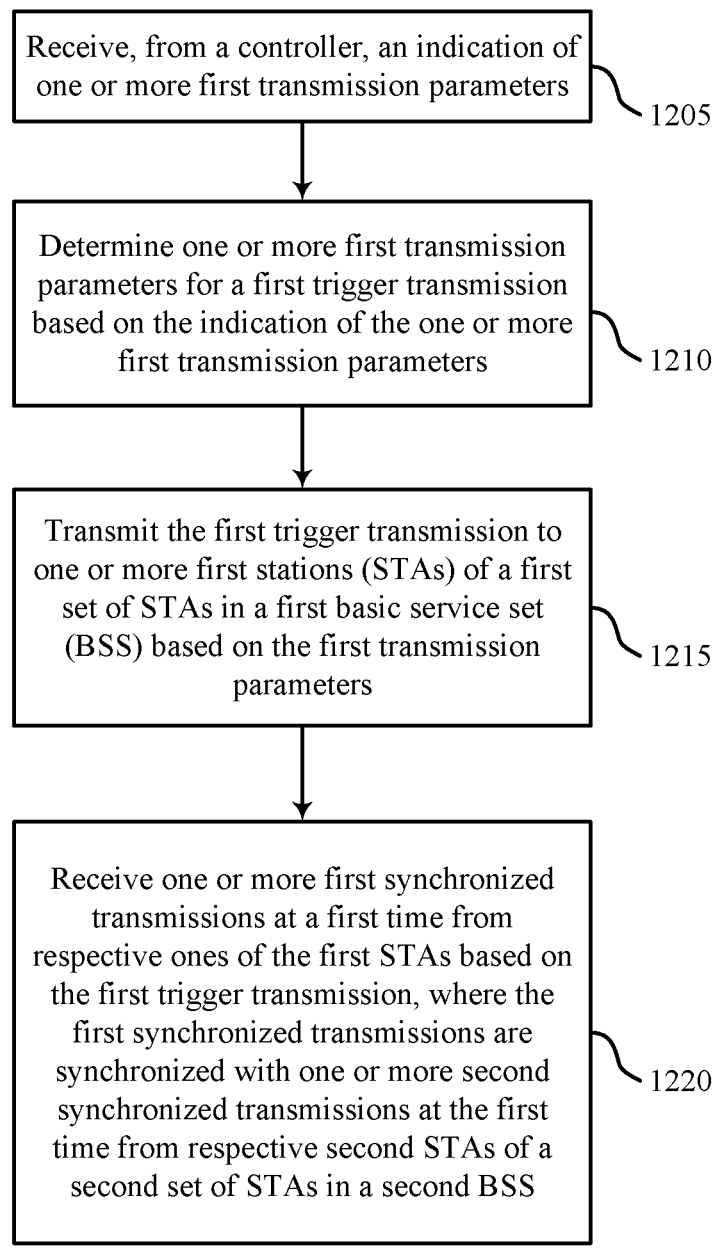

FIG. 12 shows a flowchart illustrating a method 1200 that supports multi-BSS time alignment in accordance with various aspects of the present disclosure. The operations of the method 1200 may be implemented by an AP 105 or its components as described herein. For example, the operations of method 1200 may be performed by the AP communications manager as described with reference to FIGS. 5 and 6 and the AP communications module as described with reference to FIG. 7. In some implementations, the AP 105 may execute a set of codes to control the functional elements of the device to perform the functions described below. Additionally or alternatively, the AP 105 may perform aspects of the functions described below using special-purpose hardware.

At block 1205, the AP 105 may receive, from a controller, an indication of one or more first transmission parameters. In some implementations, aspects of the operations of block 1205 may be performed by a parameter component as described with reference to FIGS. 6 and 9.

At block 1210, the AP 105 may determine one or more first transmission parameters for a first trigger transmission based on the indication of the one or more first transmission parameters received at block 1205. In some implementations, aspects of the operations of block 1210 may be performed by a parameter component as described with reference to FIGS. 6 and 9.

At block 1215, the AP 105 may transmit the first trigger transmission to one or more first STAs of a first set of STAs in a first BSS based on the first transmission parameters. In some implementations, aspects of the operations of block 1215 may be performed by a trigger component as described with reference to FIG. 6.

At block 1220, the AP 105 may receive one or more first synchronized transmissions at a first time from respective ones of the first STAs based on the first trigger transmission, where the first synchronized transmissions may be synchronized with one or more second synchronized transmissions at the first time from respective second STAs of a second set of STAs in a second BSS. In some implementations, aspects of the operations of block 1220 may be performed by a synchronized transmission manager as described with reference to FIG. 6.

Figure 13:
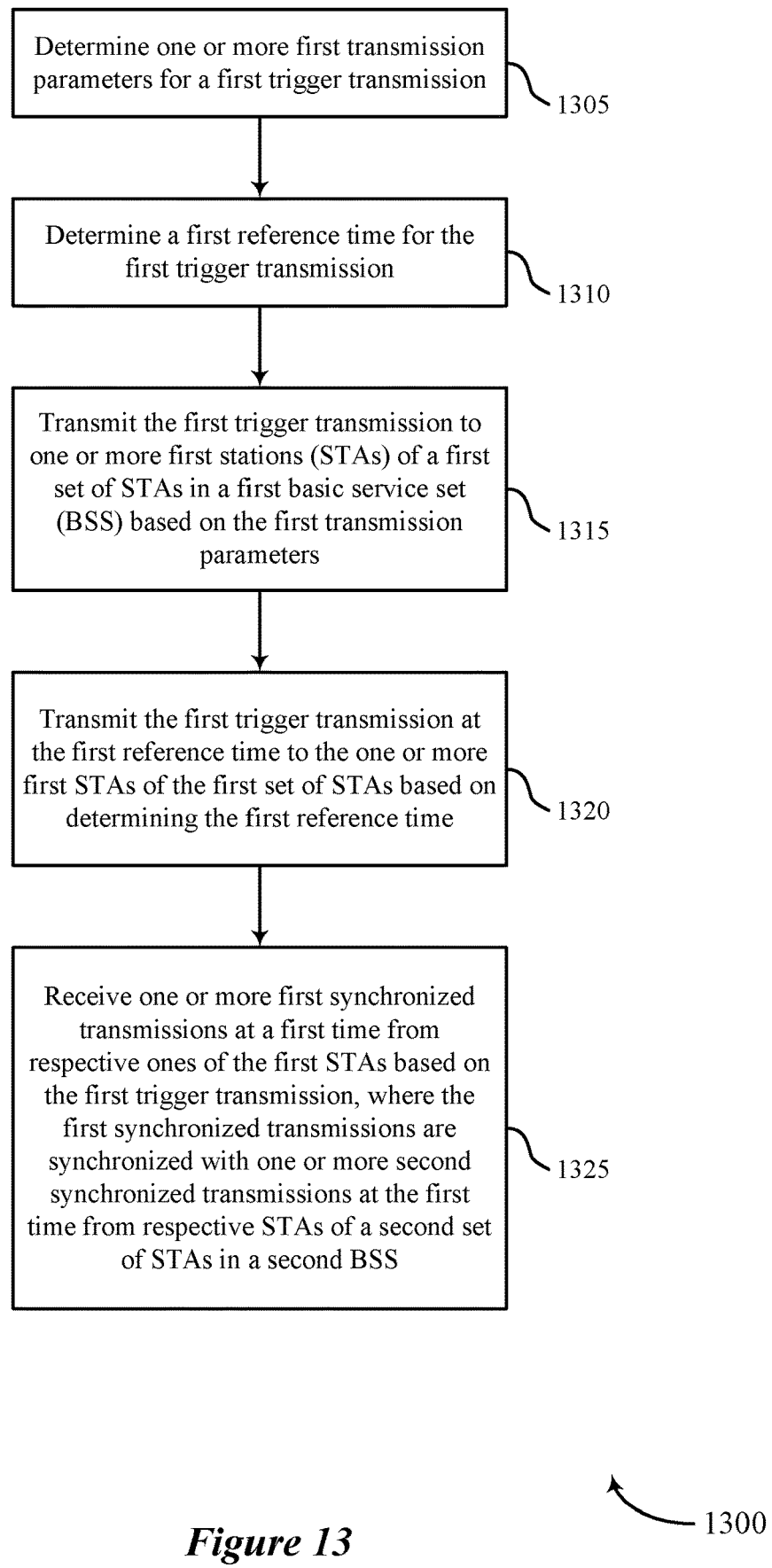

FIG. 13 shows a flowchart illustrating a method 1300 that supports multi-BSS time alignment in accordance with various aspects of the present disclosure. The operations of the method 1400 may be implemented by an AP 105 or its components as described herein. For example, the operations of method 1300 may be performed by the AP communications manager as described with reference to FIGS. 5 and 6 and the AP communications module as described with reference to FIG. 7. In some implementations, the AP 105 may execute a set of codes to control the functional elements of the device to perform the functions described below. Additionally or alternatively, the AP 105 may perform aspects of the functions described below using special-purpose hardware.

At block 1305, the AP 105 may determine one or more first transmission parameters for a first trigger transmission. In some implementations, aspects of the operations of block 1305 may be performed by a parameter component as described with reference to FIGS. 6 and 9.

At block 1310, the AP 105 may determine a first reference time for the first trigger transmission. In some implementations, aspects of the operations of block 1310 may be performed by a timing component as described with reference to FIGS. 6 and 9.

At block 1315, the AP 105 may transmit the first trigger transmission to one or more first STAs of a first set of STAs in a first BSS based on the first transmission parameters. In some implementations, aspects of the operations of block 1315 may be performed by a trigger component as described with reference to FIG. 6.

At block 1320, the AP 105 may transmit the first trigger transmission at the first reference time to the one or more first STAs of the first set of STAs based on determining the first reference time. In some implementations, aspects of the operations of block 1320 may be performed by a trigger component as described with reference to FIG. 6.

At block 1325, the AP 105 may receive one or more first synchronized transmissions at a first time from respective ones of the first STAs based on the first trigger transmission, where the first synchronized transmissions may be synchronized with one or more second synchronized transmissions at the first time from respective STAs of a second set of STAs in a second BSS. In some implementations, aspects of the operations of block 1425 may be performed by a synchronized transmission manager as described with reference to FIG. 6.

Figure 14:
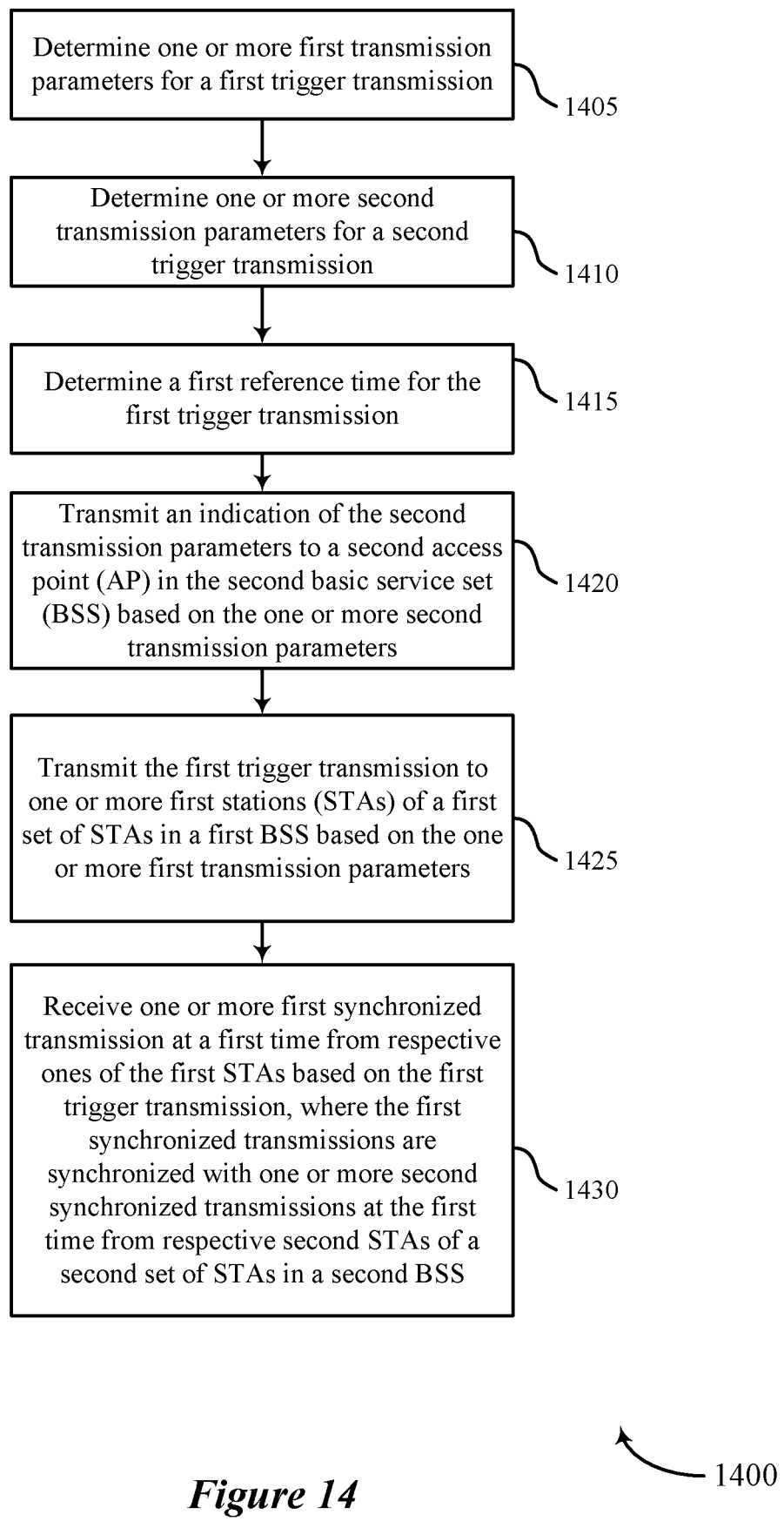

FIG. 14 shows a flowchart illustrating a method 1400 that supports multi-BSS time alignment in accordance with various aspects of the present disclosure. The operations of the method 1400 may be implemented by an AP 105 or its components as described herein. For example, the operations of method 1400 may be performed by the AP communications manager as described with reference to FIGS. 5 and 6 and the AP communications module as described with reference to FIG. 7. In some implementations, the AP 105 may execute a set of codes to control the functional elements of the device to perform the functions described below. Additionally or alternatively, the AP 105 may perform aspects of the functions described below using special-purpose hardware.

At block 1405, the AP 105 may determine one or more first transmission parameters for a first trigger transmission. In some implementations, aspects of the operations of block 1405 may be performed by a parameter component as described with reference to FIGS. 6 and 9.

At block 1410, the AP 105 may determine one or more second transmission parameters for a second trigger transmission. In some implementations, aspects of the operations of block 1410 may be performed by a parameter component as described with reference to FIGS. 6 and 9.

At block 1415, the AP 105 may determine a first reference time for the first trigger transmission. In some implementations, aspects of the operations of block 1415 may be performed by a timing component as described with reference to FIGS. 6 and 9.

At block 1420, the AP 105 may transmit an indication of the second transmission parameters to a second AP in the second BSS based on the one or more second transmission parameters. In some implementations, aspects of the operations of block 1420 may be performed by a controlling component as described with reference to FIGS. 6 and 9.

At block 1425, the AP 105 may transmit the first trigger transmission to one or more first STAs of a first set of STAs in a first BSS based on the one or more first transmission parameters. In some implementations, the AP 105 may transmit the first trigger transmission at the first reference time to the one or more first STAs based on determining the first reference time. In some implementations, aspects of the operations of block 1425 may be performed by a trigger component as described with reference to FIG. 6.

At block 1430, the AP 105 may receive one or more first synchronized transmissions at a first time from respective ones of the first STAs based on the first trigger transmission, where the first synchronized transmissions may be synchronized with one or more second synchronized transmissions at the first time from respective second STAs of a second set of STAs in a second BSS. In some implementations, aspects of the operations of block 1430 may be performed by a synchronized transmission manager as described with reference to FIG. 6.

Figure 15:
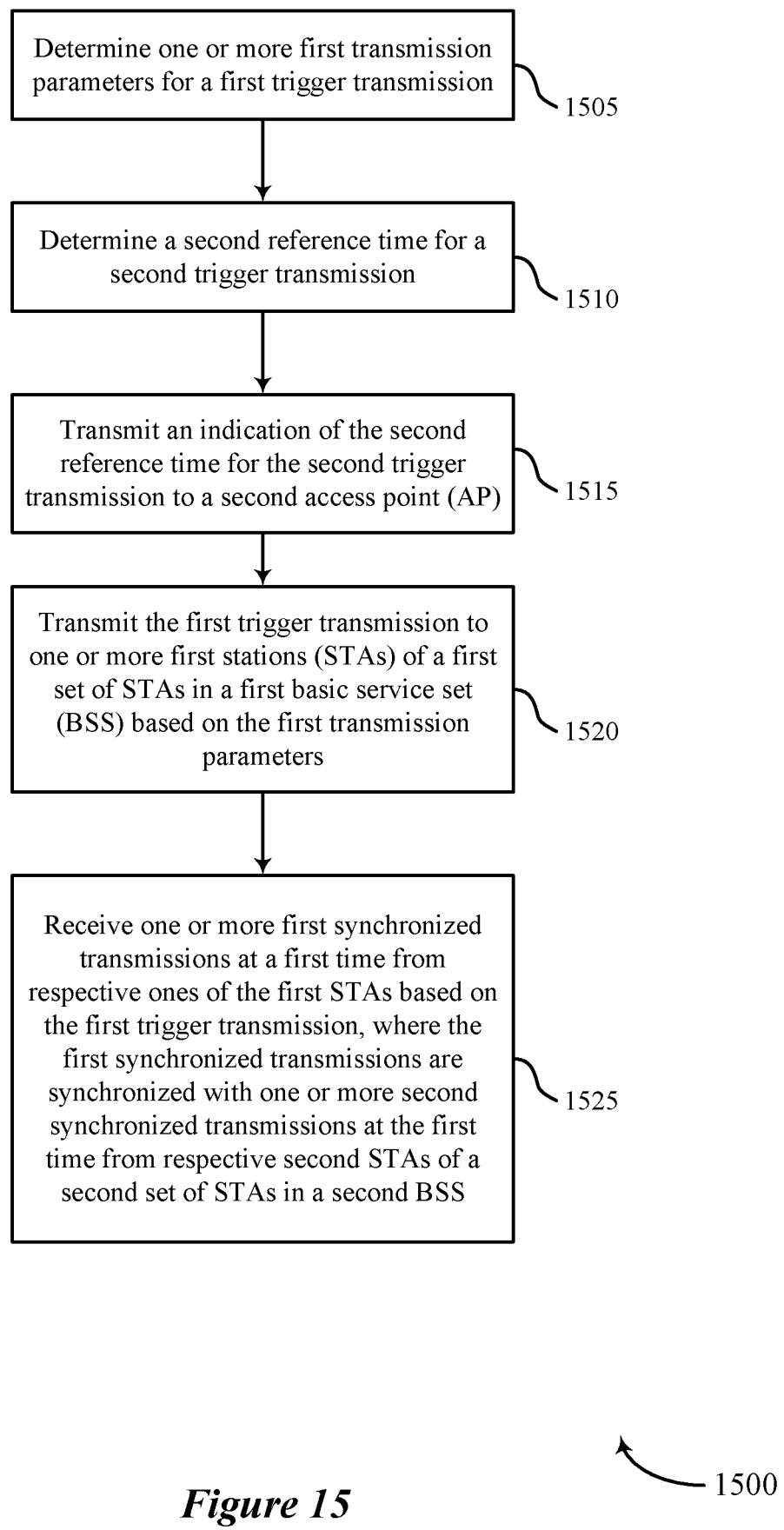

FIG. 15 shows a flowchart illustrating a method 1500 that supports multi-BSS time alignment in accordance with various aspects of the present disclosure. The operations of the method 1500 may be implemented by an AP 105 or its components as described herein. For example, the operations of method 1500 may be performed by the AP communications manager as described with reference to FIGS. 5 and 6 and the AP communications module as described with reference to FIG. 7. In some implementations, the AP 105 may execute a set of codes to control the functional elements of the device to perform the functions described below. Additionally or alternatively, the AP 105 may perform aspects of the functions described below using special-purpose hardware.

At block 1505, the AP 105 may determine one or more first transmission parameters for a first trigger transmission. In some implementations, aspects of the operations of block 1505 may be performed by a parameter component as described with reference to FIGS. 6 and 9.

At block 1510, the AP 105 may determine a second reference time for a second trigger transmission. In some implementations, aspects of the operations of block 1510 may be performed by a timing component as described with reference to FIGS. 6 and 9.

At block 1515, the AP 105 may transmit an indication of the second reference time for the second trigger transmission to a second AP. In some implementations, aspects of the operations of block 1515 may be performed by a controlling component as described with reference to FIGS. 6 and 9.

At block 1520, the AP 105 may transmit the first trigger transmission to one or more first STAs of a first set of STAs in a first BSS based on the first transmission parameters. In some implementations, aspects of the operations of block 1520 may be performed by a trigger component as described with reference to FIG. 6.

At block 1525, the AP 105 may receive one or more first synchronized transmissions at a first time from respective ones of the first STAs based on the first trigger transmission, where the first synchronized transmissions may be synchronized with one or more second synchronized transmissions at the first time from respective second STAs of a second set of STAs in a second BSS. In some implementations, aspects of the operations of block 1525 may be performed by a synchronized transmission manager as described with reference to FIG. 6.

Figure 16:
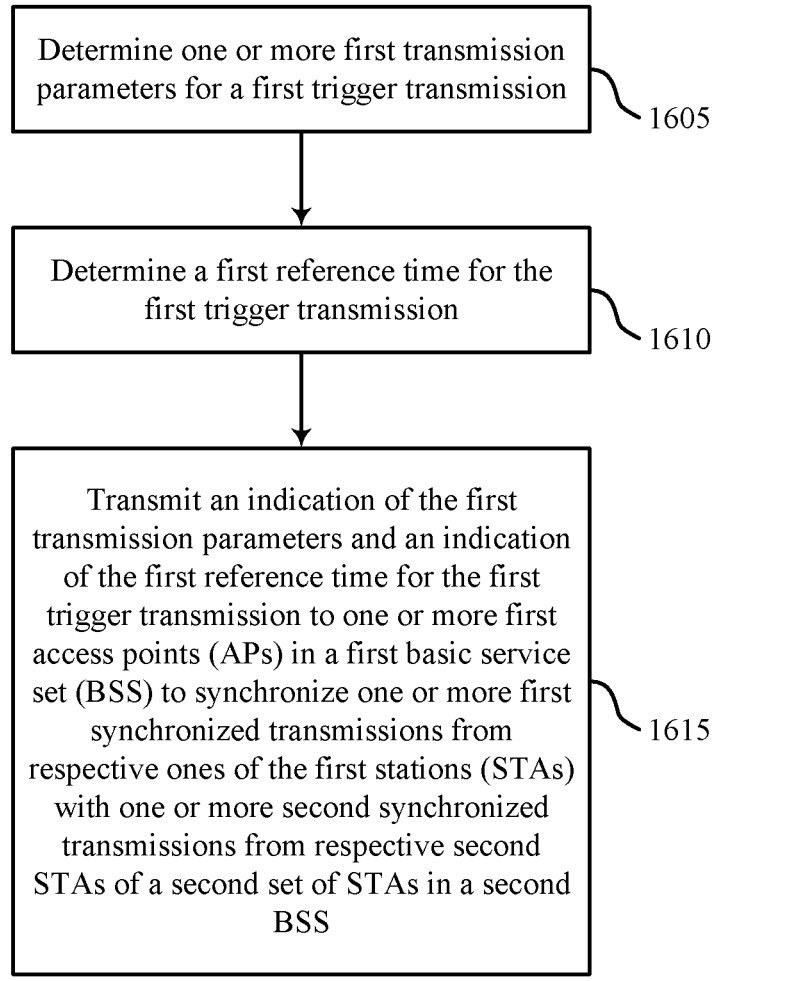

FIG. 16 shows a flowchart illustrating a method 1600 that supports multi-BSS time alignment in accordance with various aspects of the present disclosure. The operations of the method 1600 may be implemented by a controller 210 as described with reference to FIG. 2, or its components as described herein. For example, the operations of the method 1600 may be performed by the controller communications manager as described with reference to FIGS. 8 and 9. In some implementations, the controller 210 may execute a set of codes to control the functional elements of the device to perform the functions described below. Additionally or alternatively, the controller 210 may perform aspects of the functions described below using special-purpose hardware.

At block 1605, the controller 210 may determine one or more first transmission parameters for a first trigger transmission. In some implementations, aspects of the operations of block 1605 may be performed by a parameter component as described with reference to FIGS. 6 and 9.

At block 1610, the controller 210 may determine a first reference time for the first trigger transmission. In some implementations, aspects of the operations of block 1610 may be performed by a timing component as described with reference to FIGS. 6 and 9.

At block 1615, the controller 210 may transmit an indication of the first transmission parameters and an indication of the first reference time for the first trigger transmission to one or more first APs in a first BSS to synchronize one or more first synchronized transmissions from respective ones of the first STAs with one or more second synchronized transmissions from respective second STAs of a second set of STAs in a second BSS. In some implementations, aspects of the operations of block 1615 may be performed by a controlling component as described with reference to FIGS. 6 and 9.

Figure 17:
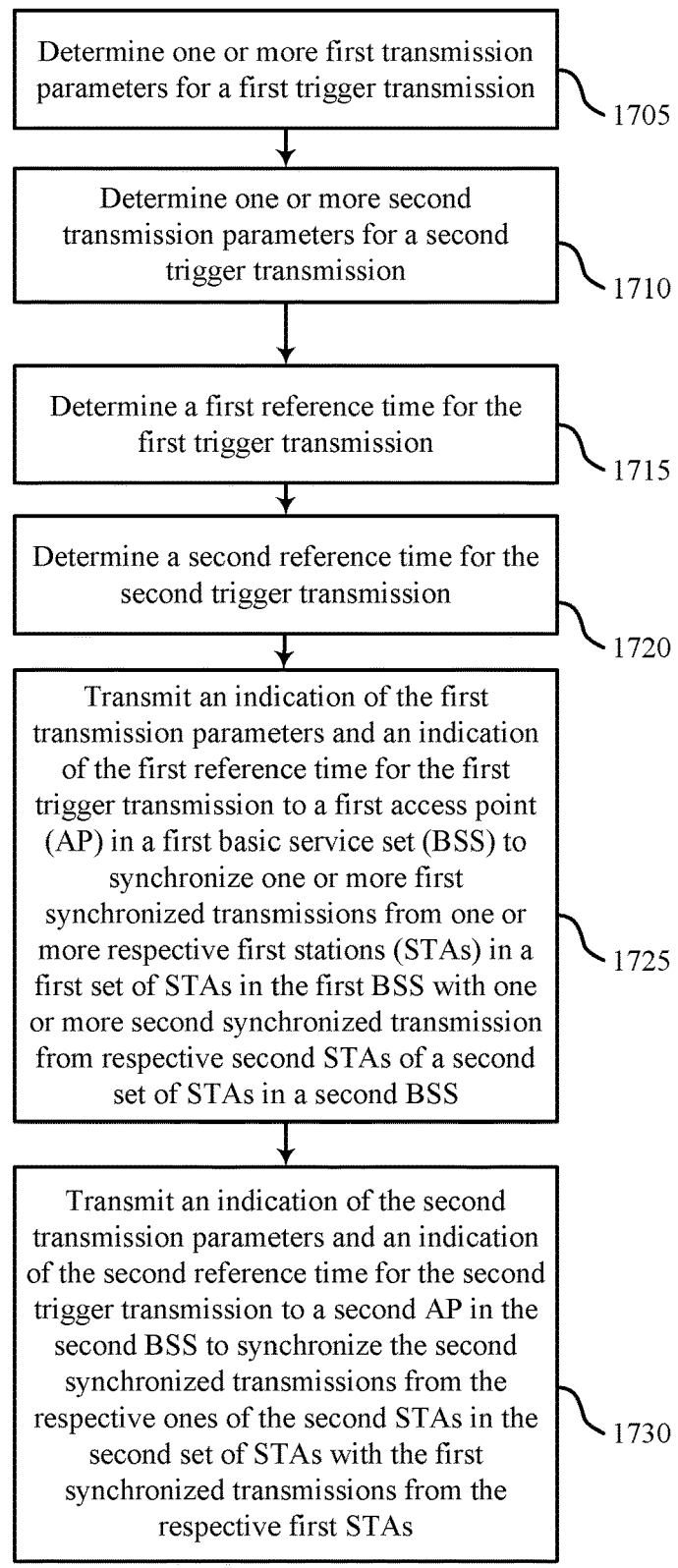

FIG. 17 shows a flowchart illustrating a method 1700 that supports multi-BSS time alignment in accordance with various aspects of the present disclosure. The operations of the method 1700 may be implemented by a controller 210 as described with reference to FIG. 2, or its components as described herein. For example, the operations of method 1700 may be performed by the controller communications manager as described with reference to FIGS. 8 and 10. In some implementations, the controller 210 may execute a set of codes to control the functional elements of the device to perform the functions described below. Additionally or alternatively, the controller 210 may perform aspects of the functions described below using special-purpose hardware.

At block 1705, the controller 210 may determine one or more first transmission parameters for a first trigger transmission. In some implementations, aspects of the operations of block 1705 may be performed by a parameter component as described with reference to FIGS. 6 and 9.

At block 1710, the controller 210 may determine one or more second transmission parameters for a second trigger transmission. In some implementations, aspects of the operations of block 1710 may be performed by a parameter component as described with reference to FIGS. 6 and 9.

At block 1715, the controller 210 may determine a first reference time for the first trigger transmission. In some implementations, aspects of the operations of block 1715 may be performed by a timing component as described with reference to FIGS. 6 and 9.

At block 1720, the controller 210 may determine a second reference time for the second trigger transmission. In some implementations, aspects of the operations of block 1720 may be performed by a timing component as described with reference to FIGS. 6 and 9.

At block 1725, the controller 210 may transmit an indication of the first transmission parameters and an indication of the first reference time for the first trigger transmission to a first AP in a first BSS to synchronize one or more first synchronized transmissions from one or more respective first STAs in a first set of STAs in the first BSS with one or more second synchronized transmission from respective second STAs of a second set of STAs in a second BSS. In some implementations, aspects of the operations of block 1725 may be performed by a controlling component as described with reference to FIGS. 6 and 9.

At block 1730, the controller 210 may transmit an indication of the second transmission parameters and an indication of the second reference time for the second trigger transmission to a second AP in the second BSS to synchronize the second synchronized transmissions from the respective ones of the second STAs in the second set of STAs with the first synchronized transmissions from the respective first STAs. In some implementations, aspects of the operations of block 1730 may be performed by a controlling component as described with reference to FIGS. 6 and 9.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a DSP, an ASIC, a FPGA or other PLD, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media. Also, any connection is properly termed a computer-readable medium. For example, software transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Various modifications to the implementations described in this disclosure may be readily apparent to a person having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication, comprising:
determining at least one first transmission parameter for a first trigger transmission;
determining at least one second transmission parameter for a second trigger transmission;
transmitting the first trigger transmission to a first station (STA) of a first set of STAs in a first basic service set (BSS) based at least in part on the at least one first transmission parameter;
receiving, based at least in part on the first trigger transmission, a first transmission at a first time from the first STA of the first set of STAs; and
transmitting an indication of the at least one second transmission parameter to an access point (AP) in the second BSS, the indication of the at least one second transmission parameter causing the AP in the second BSS to transmit a second trigger transmission to the second STA based at least in part on the at least one second transmission parameter, the at least one second transmission parameter being configured such that the second trigger transmission causes the second STA to transmit a second transmission such that it is synchronized in time with the first transmission.

2. The method of claim 1, further comprising:
determining a first reference time for the first trigger transmission; and
transmitting the first trigger transmission at the first reference time to the first STA of the first set of STAs based at least in part on determining the first reference time.

3. The method of claim 1, wherein:
determining the at least one first transmission parameter comprises determining a first trigger data precoding for the first trigger transmission; and
determining the at least one second transmission parameter comprises determining a second trigger data precoding for the second transmission, wherein the at least one second transmission parameter includes an indication of the second trigger data precoding.

4. The method of claim 2, further comprising determining a second reference time for the second trigger transmission, wherein the indication of the at least one second transmission parameter includes an indication of the second reference time for the second trigger transmission.

5. The method of claim 4, wherein the first reference time and the second reference time are different.

6. The method of claim 1, wherein the at least one first transmission parameter comprises a transmission order for the first trigger transmission to be transmitted to the first STA relative to the second trigger transmission to be transmitted to the second STA.

7. The method of claim 1, wherein the at least one first transmission parameter comprises a first transmission bandwidth for the first trigger transmission to be transmitted to the first STA and the at least one second transmission parameter comprises a second transmission bandwidth different than the first transmission bandwidth for the second trigger transmission to be transmitted to the second STA.

8. The method of claim 7, wherein the first transmission bandwidth is frequency-separated from the second transmission bandwidth.

9. A method for wireless communication, comprising:
determining at least one first transmission parameter for a first trigger transmission;
determining at least one second transmission parameter for a second trigger transmission;
determining a first reference time for the first trigger transmission;
determining a second reference time for the second trigger transmission;
transmitting an indication of the at least one first transmission parameter and an indication of the first reference time for the first trigger transmission to a first access point (AP) in a first basic service set (BSS) to synchronize, at a first time, a first transmission from a first station (STA) in a first set of STAs in the first BSS with a second transmission from a second STA of a second set of STAs in a second BSS; and
transmitting an indication of the at least one second transmission parameter and an indication of the second reference time for the second trigger transmission to a second AP in the second BSS to synchronize the second transmission from the second STA in the second set of STAs in the second BSS with the first transmission from the first STA of the first set of STAs in the first BSS.

10. The method of claim 9, wherein the first reference time and the second reference time are time separated.

11. The method of claim 9, wherein the one or both of the at least one first transmission parameter or the at least one second transmission parameter comprises a transmission order for the first trigger transmission or the second trigger transmission.

12. The method of claim 9, wherein the at least one first transmission parameter comprises a first transmission bandwidth for the first trigger transmission and the at least one second transmission parameter comprises a second transmission bandwidth for the second trigger transmission that is different than the first transmission bandwidth.

13. The method of claim 12, wherein the first transmission bandwidth is frequency-separated from the second transmission bandwidth.

14. The method of claim 9, further comprising:
determining a first trigger data precoding for the first trigger transmission, wherein the at least one first transmission parameter comprises an indication of the first trigger data precoding for the first trigger transmission; and
determining a second trigger data precoding for the second trigger transmission, wherein the at least one second transmission parameter comprises an indication of the second trigger data precoding for the second trigger transmission.

15. The method of claim 14, further comprising:
determining a first spatial stream, wherein the indication of the first trigger data precoding comprises an indication of the first spatial stream; and
determining a second spatial stream, wherein the indication of the second trigger data precoding comprises an indication of the second spatial stream.

16. An apparatus for wireless communication, comprising:
a processor;
memory in electronic communication with the processor; and
instructions stored in the memory and executed by the processor to cause the apparatus to:
determine at least one first transmission parameter for a first trigger transmission;
determine at least one second transmission parameter for a second trigger transmission;
transmit the first trigger transmission to a first station (STA) of a first set of STAs in a first basic service set (BSS) based at least in part on the at least one first transmission parameter;
receive, based at least in part on the first trigger transmission, a first transmission at a first time from the first STA of the first set of STAs, wherein the first transmission is synchronized in time with a second transmission from a second STA of a second set of STAs in a second BSS; and
transmit an indication of the at least one second transmission parameter to an access point (AP) in the second BSS, the indication of the at least one second transmission parameter causing the AP in the second BSS to transmit a second trigger transmission to the second STA based at least in part on the at least one second transmission parameter, the at least one second transmission parameter being configured such that the second trigger transmission causes the second STA to transmit the second transmission such that it is synchronized in time with the first transmission.

17. The apparatus of claim 16, wherein the at least one first transmission parameter comprises a transmission order for the first trigger transmission to be transmitted to the first STA relative to the second trigger transmission to be transmitted to the second STA.

18. The apparatus of claim 16, wherein the at least one first transmission parameter comprises a first transmission bandwidth for the first trigger transmission to be transmitted to the first STA and the at least one second transmission parameter comprises a second transmission bandwidth for the second trigger transmission to be transmitted to the second STA, the second transmission bandwidth being frequency-separated from the first transmission bandwidth.

19. The apparatus of claim 16, wherein:
determining the at least one first transmission parameter comprises determining a first trigger data precoding for the first trigger transmission; and
determining the at least one second transmission parameter comprises determining a second trigger data precoding for the second transmission, wherein the at least one second transmission parameter includes an indication of the second trigger data precoding.

20. An apparatus for wireless communication, comprising:
a processor;
memory in electronic communication with the processor; and
instructions stored in the memory and executed by the processor to cause the apparatus to:
determine at least one first transmission parameter for a first trigger transmission;
determine at least one second transmission parameter for a second trigger transmission;
determine a first reference time for the first trigger transmission;
determine a second reference time for the second trigger transmission;
transmit an indication of the at least one first transmission parameter and an indication of the first reference time for the first trigger transmission to a first access point (AP) in a first basic service set (BSS) to synchronize, at a first time, a first transmission from a first station (STA) in a first set of STAs in the first BSS with a second transmission from a second STA of a second set of STAs in a second BSS; and transmit an indication of the at least one second transmission parameter and an indication of the second reference time for the second trigger transmission to a second AP in the second BSS to synchronize the second transmission from the second STA in the second set of STAs in the second BSS with the first transmission from the first STA of the first set of STAs in the first BSS.

21. The apparatus of claim 16, wherein the instructions are further configured to cause the apparatus to:
   determine a first reference time for the first trigger transmission;
   transmit the first trigger transmission at the first reference time to the first STA of the first set of STAs based at least in part on determining the first reference time; and
   determine a second reference time for the second trigger transmission that is different than the first reference time, wherein the indication of the at least one second transmission parameter includes an indication of the second reference time for the second trigger transmission.

22. The apparatus of claim 9, wherein the first reference time and the second reference time are time separated.

23. The apparatus of claim 9, wherein the one or both of the at least one first transmission parameter or the at least one second transmission parameter comprises a transmission order for the first trigger transmission or the second trigger transmission.

24. The apparatus of claim 9, wherein the at least one first transmission parameter comprises a first transmission bandwidth for the first trigger transmission and the at least one second transmission parameter comprises a second transmission bandwidth for the second trigger transmission that is frequency-separated from the first transmission bandwidth.

25. The apparatus of claim 9, wherein the instructions are further configured to cause the apparatus to:
   determine a first trigger data precoding for the first trigger transmission, wherein the at least one first transmission parameter comprises an indication of the first trigger data precoding for the first trigger transmission; and
   determine a second trigger data precoding for the second trigger transmission, wherein the at least one second transmission parameter comprises an indication of the second trigger data precoding for the second trigger transmission.

* * * * *